United States Patent
Deroover

(10) Patent No.: US 7,648,572 B2
(45) Date of Patent: *Jan. 19, 2010

(54) NON-AQUEOUS PIGMENT DISPERSIONS USING DISPERSION SYNERGISTS

(75) Inventor: Geert Deroover, Lier (BE)

(73) Assignee: Agfa Graphics NV, Mortsel (BE)

( * ) Notice: Subject to any disclaimer, the term of this patent is extended or adjusted under 35 U.S.C. 154(b) by 0 days.

This patent is subject to a terminal disclaimer.

(21) Appl. No.: 12/094,699

(22) PCT Filed: Nov. 28, 2006

(86) PCT No.: PCT/EP2006/069017

§ 371 (c)(1),
(2), (4) Date: May 22, 2008

(87) PCT Pub. No.: WO2007/060262

PCT Pub. Date: May 31, 2007

(65) Prior Publication Data

US 2009/0048375 A1      Feb. 19, 2009

Related U.S. Application Data

(60) Provisional application No. 60/751,551, filed on Dec. 19, 2005.

(30) Foreign Application Priority Data

Nov. 28, 2005   (EP)   ................... 05111360

(51) Int. Cl.
  C09D 11/02    (2006.01)
  C09B 48/00    (2006.01)
  C09B 67/20    (2006.01)
  C08K 5/07     (2006.01)

(52) U.S. Cl. ................. 106/31.77; 106/31.78; 106/497; 106/498

(58) Field of Classification Search ................. 106/497, 106/498, 31.77, 31.78

See application file for complete search history.

(56) References Cited

U.S. PATENT DOCUMENTS

| | | | |
|---|---|---|---|
| 3,759,731 A | 9/1973 | Kühne et al. | |
| 4,057,436 A | 11/1977 | Davies et al. | |
| 4,461,647 A | 7/1984 | Schofield et al. | |
| 4,791,204 A | 12/1988 | Jost et al. | |
| 4,844,742 A | 7/1989 | Jaffe | |
| 4,914,211 A | 4/1990 | Jost et al. | |
| 5,298,063 A * | 3/1994 | Mizuguchi et al. | 106/31.77 |
| 6,152,968 A | 11/2000 | Etzbach et al. | |
| 6,451,103 B1 | 9/2002 | Uemura et al. | |
| 6,641,655 B1 | 11/2003 | McElhinney et al. | |
| 6,827,775 B2 | 12/2004 | Bugnon | |
| 6,918,958 B2 | 7/2005 | Weber et al. | |
| 2001/0008912 A1 | 7/2001 | Weber et al. | |
| 2005/0196697 A1 | 9/2005 | Masumi et al. | |
| 2008/0295734 A1 * | 12/2008 | Deroover | 106/31.77 |
| 2008/0308005 A1 * | 12/2008 | Deroover | 106/31.78 |
| 2008/0308006 A1 * | 12/2008 | Deroover | 106/31.78 |

FOREIGN PATENT DOCUMENTS

| | | |
|---|---|---|
| DE | 1619618 | 12/1969 |
| EP | 0 763 378 A2 | 3/1997 |
| EP | 0 805 189 A2 | 11/1997 |
| JP | 2004-67714 A | 3/2004 |
| WO | 02/064680 A1 | 8/2002 |

OTHER PUBLICATIONS

Official communication issued in the International Application No. PCT/EP2006/069017, mailed on Aug. 1, 2007.
Deroover et al.; "Non-Aqueous Quinacridone Dispersions Using Dispersion Synergists"; U.S. Appl. No. 12/094,686, filed May 22, 2008.
Deroover; "Non-Aqueous Pigment Dispersions Using Dispersion Synergists"; U.S. Appl. No. 12/094,689, filed May 22, 2008.
Deroover; " Quinacridone Derivatives for Pigment Dispersions"; U.S. Appl. No. 12/094,720, filed May 22, 2008.
Deroover; "Non-Aqueous Pigment Dispersions Using Dispersion Synergists"; U.S. Appl. No. 12/094,451, filed May 21, 2008.
Deroover; "Diketopyrrolo-Pyrrole Compounds"; U.S. Appl. No. 12/094,470, filed May 21, 2008.
Deroover; "Non-Aqueous Dispersions of Naphthol as Pigments"; U.S. Appl. No. 12/094,472, filed May 21, 2008.
Deroover et al.; "Non-Aqueous Pigment Dispersions Containing Specific Dispersion Synergists"; U.S. Appl. No. 12/094,790, filed May 23, 2008.
Deroover et al.; "Non-Aqueous Pigment Dispersions Containing Specific Dispersion Synergists"; U.S. Appl. No. 12/094,793, filed May 23, 2008.

* cited by examiner

*Primary Examiner*—Helene Klemanski
(74) *Attorney, Agent, or Firm*—Keating & Bennett, LLP

(57) ABSTRACT

A non-aqueous pigment dispersion including a diketopyrrolo-pyrrole pigment, a polymeric dispersant, and a dispersion synergist in a dispersion medium wherein the dispersion synergist is a quinacridone derivative containing at least one acidic group or a salt thereof.

13 Claims, No Drawings

NON-AQUEOUS PIGMENT DISPERSIONS USING DISPERSION SYNERGISTS

CROSS-REFERENCE TO RELATED APPLICATIONS

This application is a 371 National Stage Application of PCT/EP2006/069017, filed Nov. 28, 2006. This application claims the benefit of U.S. Provisional Application No. 60/751,551, filed Dec. 19, 2005, which is incorporated by reference herein in its entirety. In addition, this application claims the benefit of European Application No. 05111360.3, filed Nov. 28, 2005, which is also incorporated by reference herein in its entirety.

BACKGROUND OF THE INVENTION

1. Field of the Invention

The present invention relates to stable diketopyrrolo-pyrrole dispersions and inkjet inks using specific dispersion synergists.

2. Description of the Related Art

Pigment dispersions are made using a dispersant. A dispersant is a substance for promoting the formation and stabilization of a dispersion of pigment particles in a dispersion medium. Dispersants are generally surface-active materials having an anionic, cationic or non-ionic structure. The presence of a dispersant substantially reduces the required dispersing energy. Dispersed pigment particles may have a tendency to re-agglomerate after the dispersing operation due to mutual attraction forces. The use of dispersants also counteracts this re-agglomeration tendency of the pigment particles.

The dispersant has to meet particularly high requirements when used for inkjet inks. Inadequate dispersing manifests itself as increased viscosity in liquid systems, loss of brilliance and/or hue shifts. Moreover, particularly good dispersion of the pigment particles is required to ensure unimpeded passage of the pigment particles through the nozzles of the print head in an inkjet printer, which are usually only a few micrometers in diameter. In addition, pigment particle agglomeration and the associated blockage of the printer nozzles has to be avoided during the standby periods of the printer.

Many polymeric dispersants contain in one part of the molecule so-called anchor groups, which adsorb onto the pigments to be dispersed. In a spatially separate part of the molecule, polymeric dispersants have polymer chains sticking out whereby pigment particles are made compatible with the dispersion medium, i.e., stabilized.

In aqueous inkjet inks, the polymeric dispersants generally contain hydrophobic anchor groups exhibiting a high affinity for the pigment surface and hydrophilic polymer chains for stabilizing the pigments in the aqueous dispersion medium.

The preparation of good thermally stable dispersions with submicron particles is more difficult for non-aqueous inkjet inks, such as solvent based, oil based and radiation curable inkjet inks. The pigments are especially difficult to disperse when they have a non-polar surface.

These problems have led to the design of very specific polymeric dispersants wherein the anchor groups are pigment derivatives. For example, EP 0763378 A (TOYO INK) discloses a pigment composition including a non-aqueous type pigment dispersing agent having a portion which has a high affinity with a pigment and which has at least one type selected from the group consisting of an organic dye, anthraquinone and acridone only at a terminal end or at both terminal ends of at least one polymer selected from a linear urethane polymer and a linear acrylic polymer, and a pigment.

Another approach for dispersing pigments with non-polar surfaces in non-aqueous dispersion media is changing the surface to a more polar surface by addition of compounds known as dispersion synergists. A dispersion synergist is a compound that promotes the adsorption of the polymeric dispersant on the surface of the pigment. It is suggested that the synergist should possess the pigment structure substituted by one or more sulphonic acid groups or ammonium salts thereof.

U.S. Pat. No. 4,461,647 (ICI) discloses a dispersion of a pigment in an organic liquid containing a water-insoluble asymmetric disazo compound including a central divalent group free from acidic and other ionic substituents linked through azo groups to two monovalent end groups wherein one end group, the first, is free from acidic and other ionic substituents and the other end group, the second, carries a single substituted ammonium-acid salt group.

U.S. Pat. No. 4,057,436 (ICI) discloses pigment dispersions in organic liquids using polymeric or resinous dispersing agents in the presence of a substituted ammonium salt of a colored acid wherein there are between 16 and 60 carbon atoms contained in at least 3 chains attached to the N-atom of the substituted ammonium ion.

U.S. Pat. No. 6,641,655 (AVECIA) discloses the use of a diquaternary ammonium salt of a colored acid as a fluidizing agent wherein the diquaternary ammonium cation contains two or more nitrogen atoms.

Although these dispersion synergists work fine for some pigments, many other pigments cannot be dispersed to an acceptable quality in a non-aqueous medium. This is the case for quinacridone pigments, for which it is difficult to obtain stable non-aqueous pigment dispersions, especially stable non-aqueous inkjet inks.

Sulfonated quinacridone derivatives have been disclosed, for example, by U.S. Pat. No. 6,152,968 (BASF). However, U.S. (BASF) is silent on their use in non-aqueous media.

U.S. Pat. No. 6,827,775 (CIBA SPECIALTY CHEMICALS) discloses the use of a pigment and its sulfonation product in a solid solution, water and organic solvents such as xylene. However, U.S. (CIBA SPECIALTY CHEMICALS) is silent on the stability of non-aqueous dispersions of quinacridone type pigments and their sulfonation products.

U.S. Pat. No. 4,844,742 (CIBA GEIGY) discloses the surface modification of quinacridone pigments, wherein the pigment is treated with a solvent-free, basic, nitrogen-containing copolymer of the polyurethane series and with a dispersion-improving quinacridone derivative resulting in compositions exhibiting enhanced performance in automotive and other finish systems. The derivatives used are phthalimidomethyl or sulfonic acid derivatives of quinacridone. Again no details are given on the stability of non-aqueous dispersions of quinacridone type pigments.

WO 02/064680 (CLARIANT) discloses quinacridone derivatives including sulfonic acid and carboxylic acid groups used as pigment dispersants in aqueous and non-aqueous inkjet inks and in hotmelt inkjet inks. Radiation curable inkjet inks are not disclosed.

DE 1619618 (DU PONT) discloses quinacridone pigments including upto 25 wt % of quinacridone derivatives including carboxylic acid groups. Pigment dispersions using the quinacridone derivatives are not disclosed.

U.S. 2005/0196697 (KONICA MINOLTA) discloses actinic ray curable compositions containing a quinacridone pigment, a dispersant, a cationically polymerizable monomer, a photo acid generator, and a quinacridone derivative. The exemplified quinacridone derivatives include sulfonamido groups.

U.S. Pat. No. 6,451,103 (TOYO INK) discloses self-dispersible aqueous pigment dispersions of quinacridone pigments with water-soluble pigment derivatives including one or more groups having a carboxylic acid or sulfonic acid or salts thereof. Non-aqueous pigment dispersions are not disclosed.

For consistent image quality, inkjet inks require a dispersion stability capable of dealing with high temperatures (above 60° C.) during transport of the ink to a customer, jetting at elevated temperatures and changes in the dispersion medium of the inkjet ink during use, for example, evaporation of solvent and increasing concentrations of humectants, penetrants and other additives.

Therefore, it is highly desirable to be able to manufacture pigment inkjet inks using quinacridone pigments in a non-aqueous medium exhibiting a high dispersion quality and stability.

SUMMARY OF THE INVENTION

In order to overcome the problems described above, preferred embodiments of the present invention provide non-aqueous quinacridone dispersions with high dispersion quality and stability.

Further preferred embodiment of the present invention provide non-aqueous quinacridone inkjet inks producing images of high image quality with a high optical density.

Further advantages of the preferred embodiments of the present invention will become apparent from the description hereinafter.

It has been surprisingly discovered that non-aqueous quinacridone pigment dispersions of high dispersion quality and stability were obtained by using a diketopyrrolo-pyrrole derivative containing an acidic group.

Advantages of the preferred embodiments of the present invention have been achieved with a non-aqueous pigment dispersion including a quinacridone pigment, a polymeric dispersant and a dispersion synergist in a dispersion medium wherein the dispersion synergist is a diketopyrrolo-pyrrole derivative containing at least one acidic group or a salt thereof.

Other features, elements, steps, characteristics and advantages of the present invention will become more apparent from the following detailed description of preferred embodiments thereof.

DETAILED DESCRIPTION OF THE PREFERRED EMBODIMENTS

Definitions

The term "colorant", as used in the preferred embodiments of the present invention means dyes and pigments.

The term "dye", as used in the preferred embodiments of the present invention means a colorant having a solubility of 10 mg/L or more in the medium in which it is applied and under the ambient conditions pertaining.

The term "pigment" is defined in DIN 55943, herein incorporated by reference, as a coloring agent that is practically insoluble in the application medium under the pertaining ambient conditions, hence having a solubility of less than 10 mg/L therein.

The term "C.I." is used in the preferred embodiments of the present application as an abbreviation for Colour Index.

The term "actinic radiation" as used in the preferred embodiments of the present invention, means electromagnetic radiation capable of initiating photochemical reactions.

The term "spectral separation factor" as used in the preferred embodiments of the present invention means the value obtained by calculating the ratio of the maximum absorbance $A_{max}$ (measured at wavelength $\lambda_{max}$) over the reference absorbance $A_{ref}$ determined at a higher wavelength $\lambda$ref.

The abbreviation "SSF" is used in the preferred embodiments of the present invention for spectral separation factor.

The term "alkyl" means all variants possible for each number of carbon atoms in the alkyl group, i.e., for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term "carboxyl group" as used in the preferred embodiments of the present invention means the functional group of carboxylic acid, i.e., —COOH. It is also known as carboxy group.

Pigment Dispersions

The non-aqueous pigmented dispersion according to a preferred embodiment of the present invention includes at least three components: (i) a quinacridone pigment, (ii) a polymeric dispersant and (iii) a diketopyrrolo-pyrrole derivative. The components are preferably present in a non-aqueous liquid dispersion medium.

The term "non-aqueous liquid" refers to a liquid carrier which should contain no water. However, sometimes a small amount, generally less than 5 wt % of water based on the total weight of the pigmented dispersion, can be present. This water is not intentionally added but comes into the formulation via other components as a contamination, such as for example polar organic solvents. Higher amounts of water than 5 wt % tend to make the non-aqueous pigmented dispersions instable, preferably the water content is less than 1 wt % based on the total weight dispersion medium and most preferably no water at all is present.

The non-aqueous pigmented dispersion according to a preferred embodiment of the present invention may further also contain at least one surfactant.

In a preferred embodiment, the non-aqueous pigmented dispersion is a non-aqueous inkjet ink. The non-aqueous inkjet ink may contain at least one humectant to prevent the clogging of the nozzle, due to its ability to slow down the evaporation rate of ink.

The non-aqueous inkjet ink is preferably an inkjet ink selected from the group consisting of an organic solvent based, an oil based and a curable inkjet ink. The curable inkjet ink is preferably radiation curable.

The viscosity of the inkjet ink is preferably lower than 100 mPa·s at 30° C. The viscosity of the inkjet ink is preferably lower than 30 mPa·s, more preferably lower than 15 mPa·s, and most preferably between 2 and 10 mPa·s at a shear rate of 100 s$^{-1}$ and a jetting temperature between 10° C. and 70° C.

The curable inkjet ink may contain as dispersion medium monomers, oligomers and/or prepolymers possessing different degrees of functionality. A mixture including combinations of mono-, di-, tri- and/or higher functionality monomers, oligomers or prepolymers may be used. A catalyst called an initiator for initiating the polymerization reaction may be included in the curable inkjet ink. The initiator can be a thermal initiator, but is preferably a photo-initiator. The photo-initiator requires less energy to activate than the monomers, oligomers and/or prepolymers to form the polymer. The photo-initiator suitable for use in the curable pigment dispersion may be a Norrish type I initiator, a Norrish type II initiator or a photo-acid generator.

The non-aqueous inkjet ink is particular suitable as a magenta inkjet ink in a non-aqueous CMYK inkjet ink set. The non-aqueous CMYK inkjet ink set may also be extended with extra inks such as red, green, blue, and/or orange to further enlarge the color gamut of the image. The CMYK ink set may also be extended by the combination of full density and light density inks of both color inks and/or black inks to improve the image quality by lowered graininess.

Diketopyrrolo-pyrrole Derivatives

The non-aqueous pigment dispersion according to a preferred embodiment of the present invention contains at least one dispersion synergist, but a mixture of dispersion synergists may be used to obtain better dispersion stability.

The dispersion synergist used in the pigment dispersions is preferably a diketopyrrolo-pyrrole derivative according to Formula (I):

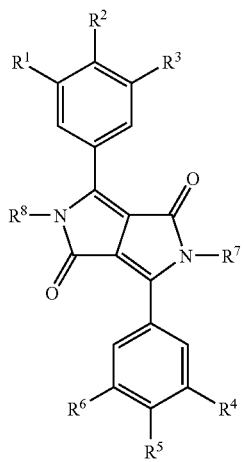

Formula (I)

wherein $R^1$, $R^2$ and $R^3$ are independently selected from the group consisting of hydrogen, a halogen atom, a methyl group, an ethyl group, an tert.-butyl group, a phenyl group, a cyano group and an acid group; $R^4$, $R^5$ and $R^6$ are independently selected from the group consisting of hydrogen, a halogen atom, a methyl group, an ethyl group, an tert.-butyl group, a phenyl group and a cyano group; and one of $R^7$ and $R^3$ is a group including at least one acidic group while the other one of $R^7$ and $R^3$ represents hydrogen.

In one preferred embodiment, the acidic group for $R^1$, $R^2$ and/or $R^3$ in the diketopyrrolo-pyrrole derivative according to Formula (I) is a carboxyl group. In a preferred embodiment, $R^1$ and $R^3$ represent a carboxyl group and $R^2$ represents hydrogen.

In another preferred embodiment, $R^1$, $R^2$ and $R^3$ in the diketopyrrolo-pyrrole derivative according to Formula (I) are independently selected from the group consisting of hydrogen, a halogen atom, a methyl group, an ethyl group, an tert.-butyl group, a phenyl group and a cyano group.

In one preferred embodiment, $R^1$, $R^3$, $R^4$ and $R^6$ in the diketopyrrolo-pyrrole derivative according to Formula (I) represent hydrogen.

In a preferred embodiment, $R^1$, $R^3$, $R^4$ and $R^6$ in the diketopyrrolo-pyrrole derivative according to Formula (I) represent hydrogen and $R^2$ and $R^5$ represent a chloro atom.

In a preferred embodiment, $R^1$, $R^3$, $R^4$ and $R^6$ in the diketopyrrolo-pyrrole derivative according to Formula (I) represent hydrogen and $R^2$ and $R^5$ represent phenyl group.

In a preferred embodiment, $R^1$, $R^2$, $R^3$, $R^4$, $R^5$ and $R^6$ in the diketopyrrolo-pyrrole derivative according to Formula (I) all represent hydrogen.

In a preferred embodiment, the group including two acid functions $R^7$ or $R^8$ is selected from the group consisting of an alkanoic acid group, an alicyclic acid group, a heterocyclic acid group, a heteroaromatic acid group and an aromatic acid group. More preferably, the group including two acid functions $R^7$ or $R^8$ is an aromatic acid group selected from the group consisting of a phthalic acid group, an isophthalic acid group or a terephthalic acid group.

The group including two acid functions $R^7$ or $R^8$ may be attached directly to the nitrogen atom of the diketopyrrolo-pyrrole derivative or may be attached through a linking group containing 1 or more carbon atoms. The linking group contains preferably 1 to 20 carbon atoms, more preferably 1 to 12 and most preferably 1 to 6 carbon atoms. In a preferred embodiment, the linking group is a straight chain of 1 or more carbon atoms, wherein some of the carbon atoms and/or hydrogen atoms may be substituted by a heteroatom.

A combination of different types of acidic groups, such as sulphonic acid and phosphoric acid may also be advantageously used.

In a preferred embodiment, the group including two acid functions $R^7$ or $R^8$ contains preferably 4 to 20 carbon atoms, more preferably 4 to 14 and most preferably 4 to 9 carbon atoms.

In making pigment dispersions, it can be advantageous to make at least one salt of the acid function, preferably of both acid functions of the group including two acid functions $R^7$ or $R^8$. The method for forming a pigment dispersion includes the steps of: (a) providing a diketopyrrolo-pyrrole derivative as defined by Formula (I); (b) transforming at least one of the two acid functions of the group including two acid functions $R^7$ or $R^8$ of the diketopyrrolo-pyrrole derivative into a salt group; and (c) mixing the diketopyrrolo-pyrrole derivative with a pigment in a dispersion medium. The charge of the acid anion is then compensated by a cation. The cation may be an inorganic cation selected from the group consisting of the Ia and IIa metals in the table of Mendeleev. In a preferred embodiment, the cation is $Li^+$.

The cation may also be an organic cation. A preferred cation is an ammonium and a substituted ammonium group. In a preferred embodiment, the cation is selected from the substituted ammonium cations disclosed in U.S. Pat. No. 4,461,647 (ICI), U.S. Pat. No. 4,057,436 (ICI) and U.S. Pat. No. 6,641,655 (AVECIA) all incorporated herein by reference.

Particularly preferred cations include the substituted ammonium groups selected from the group consisting of $^+N(CH_3)_2(C_{18}H_{37})_2$, $^+NH(CH_3)_2(C_{18}H_{37})$, $^+N(CH_3)_2(C_{12}H_{25})_2$, $^+NH(CH_3)_2(C_{12}H_{25})$, $^+N(CH_3)_2(C_{10}H_{21})_2$, $^+NH(CH_3)_2(C_{10}H_{21})$, $^+N(CH_3)_2(C_8H_{17})_2$, $^+NH(CH_3)_2(C_8H_{17})$, $^+NH(C_8H_{17})_3$, $^+NH(C_{10}H_{21})_3$, $^+NH(C_{12}H_{25})_3$ and $^+NH(C_{18}H_{35})_3$.

Suitable dispersion synergists include those disclosed in Table 1.

TABLE 1
| Dispersion Synergist | Chemical Structure |
|---|---|
| DPC-1 | 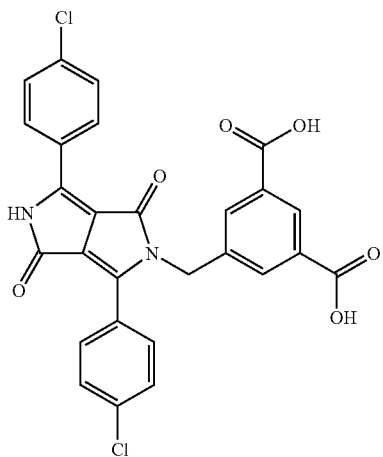 |
| DPC-2 | 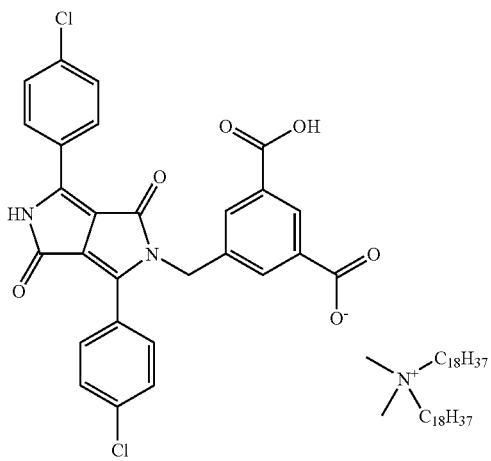 |
| DPC-3 | 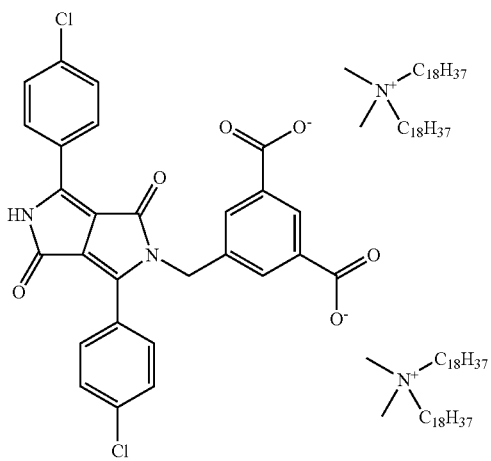 |
| DPC-4 | 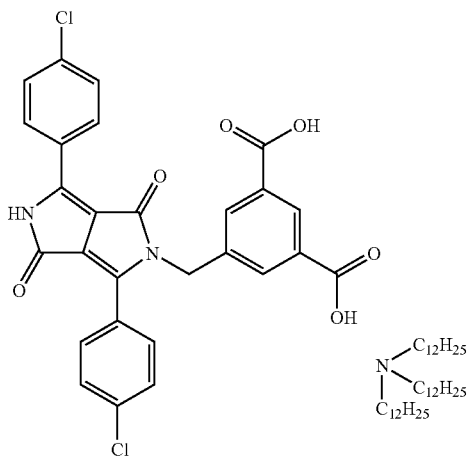 |
| DPC-5 | 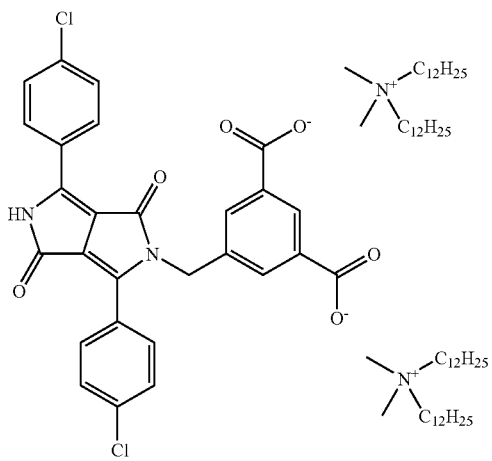 |
| DPC-6 | 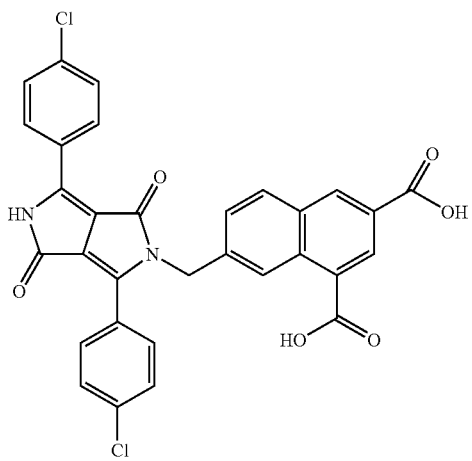 |

TABLE 1-continued
Dispersion Synergist | Chemical Structure
DPC-7
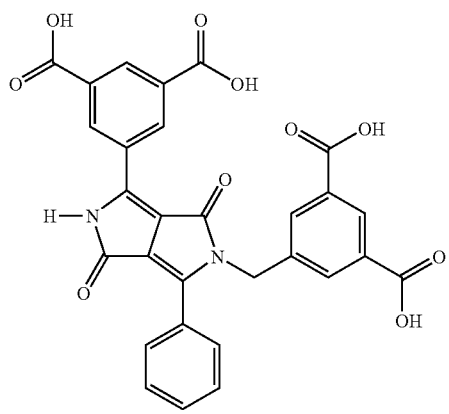
DPC-8
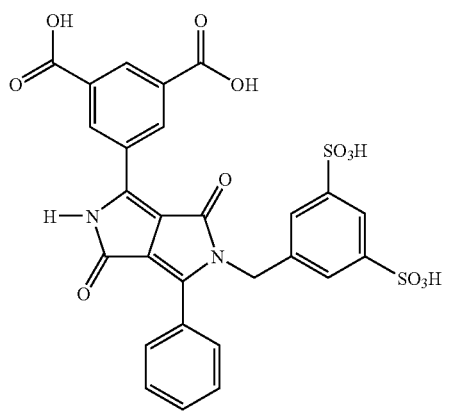
DPC-9
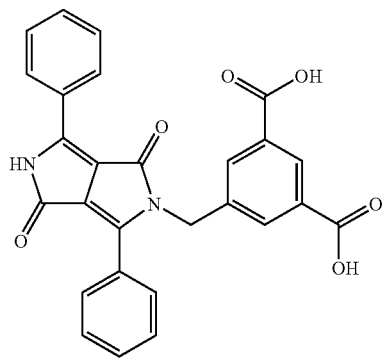
TABLE 1-continued
Dispersion Synergist | Chemical Structure
DPC-10
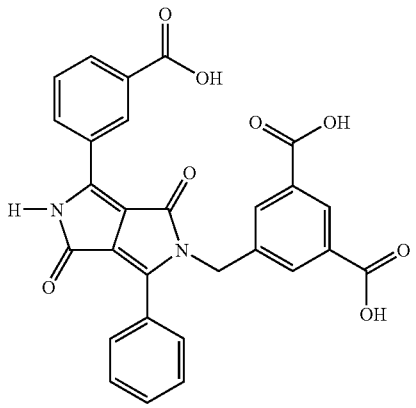
DPC-11
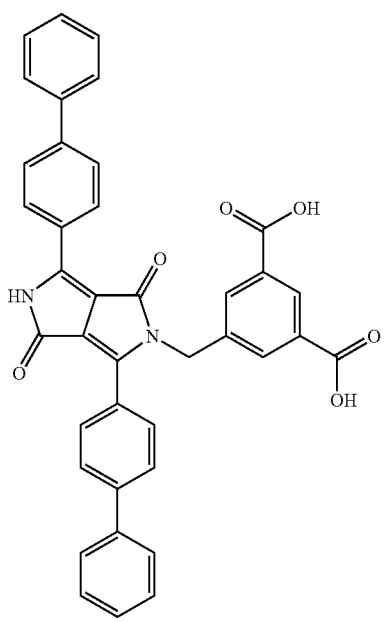
DPC-12
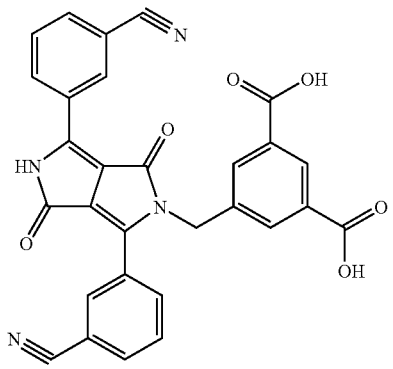

TABLE 1-continued
| Dispersion Synergist | Chemical Structure |
|---|---|
| DPC-13 | 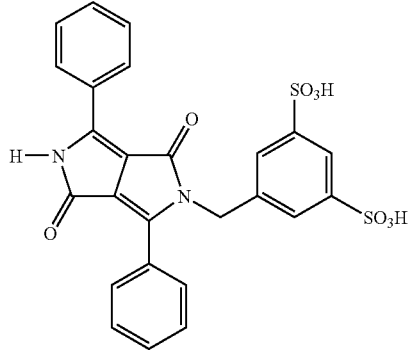 |
| DPC-14 | 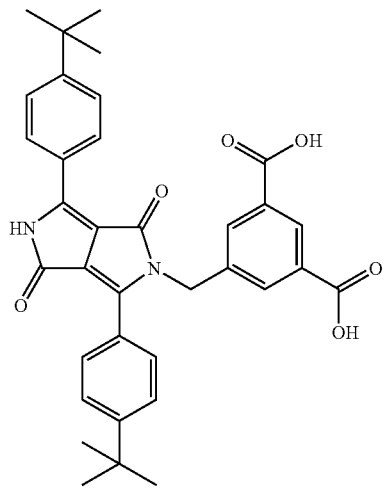 |
| DPC-15 | 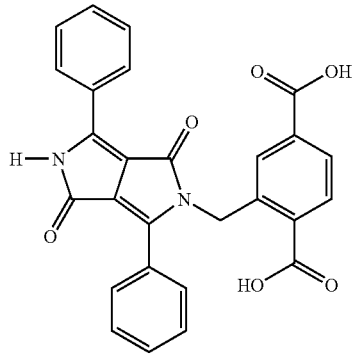 |
| DPC-16 | 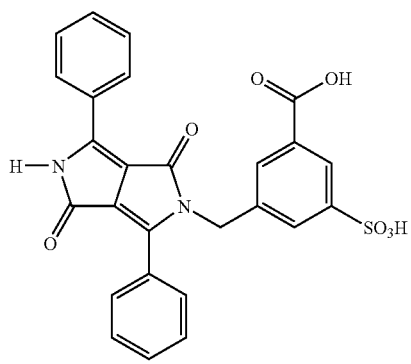 |
| DPC-17 | 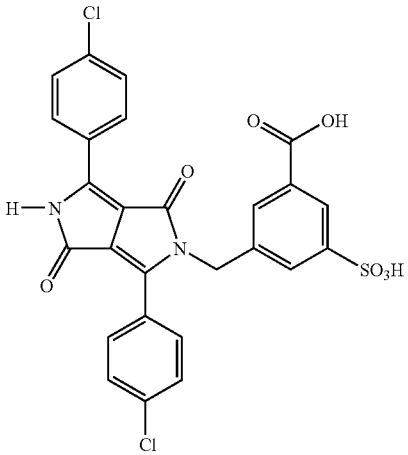 |
| DPC-18 | 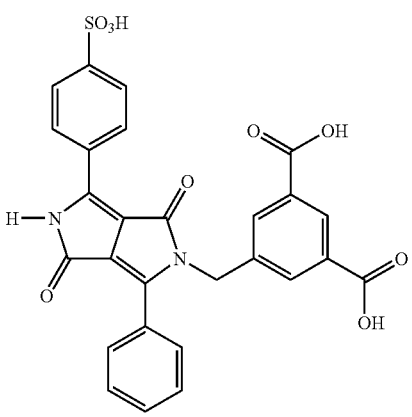 |
| DPC-19 | 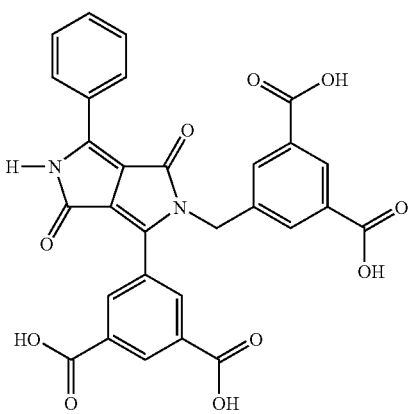 |

TABLE 1-continued

| Dispersion Synergist | Chemical Structure |
|---|---|
| DPC-20 | 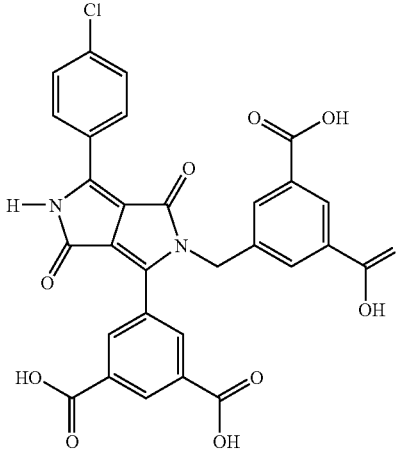 |

The substituted ammonium group can also be chemically represented as an amine with the hydrogen attached to the carboxylate anion. This is exemplified for the structure DPC-4 of Table 1.

The dispersion synergist is preferably added in an amount between 0.1 and 20 wt % based upon the weight of the pigment.

The synergist should be additional to the amount of polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Quinacridone Pigments

The pigment is a quinacridone pigment. The quinacridone pigment may be chosen from those disclosed by HERBST, Willy, et al., Industrial Organic Pigments, Production, Properties, Applications, 3rd Edition, Wiley-VCH, 2004, ISBN 3527305769.

Suitable pigments include C.I. Pigment Red 122, 192, 202, 207, 209, 282 and C.I. Pigment Violet 19.

Suitable pigments include mixed crystals of the above particularly preferred pigments. A commercially available example is Cinquasia Magenta RT-355-D from Ciba Specialty Chemicals. Preferably the quinacridone pigment is selected from the group consisting of C.I. Pigment Violet 19, C.I. Pigment Red 122, C.I. Pigment Red 202, C.I. Pigment Red 209 and mixed crystals of quinacridone pigments.

Mixed crystals are also referred to as solid solutions. Under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions.

Pigment particles in inkjet ink should be sufficiently small to permit free flow of the ink through the inkjet-printing device, especially at the ejecting nozzles. It is also desirable to use small particles for maximum color strength and to slow down sedimentation.

The average particle size of the pigment in an inkjet ink should be between 0.005 and 15 μm. The numeric average pigment particle size is preferably between 0.005 and 5 μm, more preferably between 0.005 and 1 μm, particularly preferably between 0.005 and 0.3 μm and most preferably between 0.040 and 0.150 μm.

The quinacridone pigment is preferably used in a non-aqueous pigment inkjet ink in an amount of 0.1 to 20 wt %, preferably 1 to 10 wt % based on the total weight of the non-aqueous inkjet ink. In multi-density inkjet ink-sets, a light inkjet ink preferably includes the quinacridone pigment in an amount between 0.1 to 3 wt % and a dark inkjet ink preferably includes the quinacridone pigment in an amount between 1 to 10 wt % of pigment.

The non-aqueous inkjet ink including a quinacridone pigment and the quinacridone derivative is preferably used in combination with other inkjet inks to form an inkjet ink set. These other inkjet inks may be black, cyan, magenta, yellow, red, orange, violet, blue, green, brown, mixtures thereof, and the like.

In a preferred embodiment, the inkjet ink set includes at least a cyan ink, a magenta ink, a yellow ink and a black ink. The CMYK ink set may also be extended with extra inks such as red, green, blue, and/or orange to enlarge the color gamut of the ink set. The CMYK ink set may also be extended by the combination of full density and light density inks of both color inks and/or black inks to improve the image quality by lowered graininess.

The pigment is preferably used in the non-aqueous pigment inkjet ink in an amount of 0.1 to 20 wt %, preferably 1 to 10 wt % based on the total weight of the non-aqueous inkjet ink. In multi-density inkjet ink sets, a light density inkjet ink preferably includes the pigment in an amount between 0.1 to 3 wt % and a full density inkjet ink preferably includes the pigment in an amount between 1 to 10 wt % of pigment.

The color pigment for the other inkjet inks may be chosen from those disclosed by HERBST, Willy, et al., Industrial Organic Pigments, Production, Properties, Applications, 3rd Edition, Wiley-VCH, 2004, ISBN 3527305769.

Particularly preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 180, 185 and 213.

Particularly preferred pigments are C.I. Pigment Yellow 120, 151, 154, 175, 180, 181 and 194.

Particularly preferred pigments are C.I. Pigment Blue 15:1, 15:2, 15:3, 15:4, 15:6, 16, 56, 61 and (bridged) aluminium phthalocyanine pigments.

Particularly preferred pigments are C.I. Pigment Orange 5, 13, 16, 34, 40, 43, 59, 66, 67, 69, 71 and 73.

Particularly preferred pigments are C.I. Pigment Green 7 and 36.

Particularly preferred pigments are C.I. Pigment Brown 6 and 7.

Carbon black is preferred as a pigment for the non-aqueous black inkjet ink. Suitable black pigment materials include carbon blacks such as Pigment Black 7 (e.g., Carbon Black MA8™ from MITSUBISHI CHEMICAL), Regal™ 400R, Mogul™ L, Elftex™ 320 from CABOT Co., or Carbon Black FW18, Special Black 250, Special Black 350, Special Black 550, Printex™ 25, Printex™ 35, Printex™ 55, Printex™ 90, Printex™ 150T from DEGUSSA. Additional examples of suitable pigments are disclosed in U.S. Pat. No. 5,389,133 (XEROX).

It is also possible to make mixtures of pigments in a non-aqueous inkjet ink. For example, carbon black generally exhibits a warm brownish black tone, while a neutral black tone is generally preferred. A neutral black inkjet ink can be obtained, for example, by mixing carbon black with a cyan, a magenta or a cyan and magenta pigment into the ink, as for example described in pending European patent application EP 1593718 A (AGFA). The inkjet application may also require one or more spot colors, for example, for packaging inkjet printing or textile inkjet printing. Silver and gold are often desired colors for inkjet poster printing and point-of-sales displays. Particularly preferred pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black and synthetic iron black.

Dispersants

Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:

- statistically polymerized monomers (e.g., monomers A and B polymerized into ABBAABAB);
- alternating polymerized monomers (e.g., monomers A and B polymerized into ABABABAB);
- gradient (tapered) polymerized monomers (e.g., monomers A and B polymerized into AAABAABBABBB);
- block copolymers (e.g., monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with side chains attached to the backbone); and
- mixed forms of these polymers, e.g., blocky gradient copolymers.

Polymeric dispersants may have different polymer architectures including linear, comb/branched, star, dendritic (including dendrimers and hyperbranched polymers). A general review on the architecture of polymers is given by ODIAN, George, Principles Of Polymerization, 4th Edition, Wiley-Interscience, 2004, pp. 1-18.

Comb/branched polymers have side branches of linked monomer molecules protruding from various central branch points along the main polymer chain (at least 3 branch points).

Star polymers are branched polymers in which three or more either similar or different linear homopolymers or copolymers are linked together to a single core.

Dendritic polymers include the classes of dendrimers and hyperbranched polymers. In dendrimers, with well-defined mono-disperse structures, all branch points are used (multistep synthesis), while hyperbranched polymers have a plurality of branch points and multifunctional branches that lead to further branching with polymer growth (one-step polymerization process).

Suitable polymeric dispersants may be prepared via addition or condensation type polymerizations. Polymerization methods include those described by ODIAN, George, Principles Of Polymerization, 4th Edition, Wiley-Interscience, 2004, pp. 39-606.

Addition polymerization methods include free radical polymerization (FRP) and controlled polymerization techniques. Suitable controlled radical polymerization methods include:

- RAFT: reversible addition-fragmentation chain transfer;
- ATRP: atom transfer radical polymerization
- MADIX: reversible addition-fragmentation chain transfer process, using a transfer active xanthate;
- Catalytic chain transfer (e.g., using cobalt complexes); and
- Nitroxide (e.g., TEMPO) mediated polymerizations;

Other suitable controlled polymerization methods include:

- GTP: group transfer polymerization;
- Living cationic (ring-opening) polymerizations;
- Anionic co-ordination insertion ring-opening polymerization; and
- Living anionic (ring-opening) polymerization.

Reversible addition-fragmentation transfer (RAFT): controlled polymerization occurs via rapid chain transfer between growing polymer radicals and dormant polymer chains. A review article on RAFT synthesis of dispersants with different polymeric geometry is given in QUINN J. F. et al., Facile Synthesis of Comb, Star, and Graft Polymers Via Reversible Addition-fragmentation Chain Transfer (RAFT) Polymerization, Journal of Polymer Science, Part A: Polymer Chemistry, Vol. 40, pp. 2956-2966, 2002.

Group transfer polymerization (GTP): the method of GTP used for synthesis of AB block copolymers is disclosed by SPINELLI, Harry J, GTP and Its Use in Water Based Pigment Dispersants and Emulsion Stabilisers, Proc. of 20th Int. Conf. Org. Coat. Sci. Technol., New Platz, N.Y., State Univ. N.Y., Inst. Mater. Sci. pp. 511-518.

The synthesis of dendritic polymers is described in the literature. The synthesis of dendrimers in NEWCOME, G. R., et al. Dendritic Molecules Concepts, Synthesis, Perspectives, VCH: EINHEIM, 2001. Hyperbranching polymerization is described by BURCHARD, W., Solution Properties of Branched Macromolecules, *Advances in Polymer Science*, 1999, Vol. 143, No. II, pp. 113-194. Hyperbranched materials can be obtained by polyfunctional polycondensation as disclosed by FLORY, P. J., Molecular Size Distribution in Three-dimensional Polymers, VI. Branched Polymer Containing A-R-Bf-1-type Units, *Journal of the American Chemical Society*, 1952, Vol. 74, pp. 2718-2723.

Living cationic polymerizations is, e.g., used for the synthesis of polyvinyl ethers as disclosed in WO 2005/012444 (CANON), U.S. 2005/0197424 (CANON) and U.S. 2005/0176846 (CANON). Anionic co-ordination ring-opening polymerization is, e.g., used for the synthesis of polyesters based on lactones. Living anionic ring-opening polymerization is, e.g., used for the synthesis of polyethylene oxide macromonomers.

Free radical Polymerization (FRP) proceeds via a chain mechanism, which basically includes four different types of reactions involving free radicals: (1) radical generation from non-radical species (initiation), (2) radical addition to a substituted alkene (propagation), (3) atom transfer and atom abstraction reactions (chain transfer and termination by disproportionation), and (4) radical-radical recombination reactions (termination by combination).

Polymeric dispersants having several of the above polymer compositions are disclosed in U.S. Pat. No. 6,022,908 (HP), U.S. Pat. No. 5,302,197 (DU PONT) and U.S. Pat. No. 6,528,557 (XEROX).

Suitable statistical copolymeric dispersants are disclosed in U.S. Pat. No. 5,648,405 (DU PONT), U.S. Pat. No. 6,245,832 (FUJI XEROX), U.S. Pat. No. 6,262,207 (3M), U.S. 2005/0004262 (KAO) and U.S. (KAO).

Suitable alternating copolymeric dispersants are described in U.S. 2003/0017271 (AKZO NOBEL).

Suitable block copolymeric dispersants have been described in numerous patents, especially block copolymeric dispersants containing hydrophobic and hydrophilic blocks. For example, U.S. Pat. No. 5,859,113 (DU PONT) AB block copolymers, U.S. (DU PONT) discloses ABC block copolymers.

Suitable graft copolymeric dispersants are described in CA 2157361 (DU PONT) (hydrophobic polymeric backbone and hydrophilic side chains); other graft copolymeric dispersants are disclosed in U.S. Pat. No. 6,652,634 (LEXMARK) and U.S. Pat. No. 6,521,715 (DU PONT).

Suitable branched copolymeric dispersants are described U.S. Pat. No. 6,005,023 (DU PONT), U.S. Pat. No. 6,031,019 (KAO), and U.S. (KODAK).

Suitable dendritic copolymeric dispersants are described in e.g., U.S. Pat. No. 6,518,370 (3M), U.S. Pat. No. 6,258,896 (3M), WO (GEM GRAVURE), U.S. Pat. No. 6,649,138 (QUANTUM DOT), U.S. 2002/0256230 (BASF), EP 1351759 A (EFKA ADDITIVES) and EP 1295919 A (KODAK).

Suitable designs of polymeric dispersants for inkjet inks are disclosed in SPINELLI, Harry J., Polymeric Dispersants in Inkjet technology, *Advanced Materials,* 1998, Vol. 10, No. 15, pp. 1215-1218.

The monomers and/or oligomers used to prepare the polymeric dispersant can be any monomer and/or oligomer found in the Polymer Handbook Vol. 1+2, 4th Edition, edited by J. BRANDRUP et al., Wiley-Interscience, 1999.

Polymers useful as pigment dispersants include naturally occurring polymers, and specific examples thereof include: proteins, such as glue, gelatine, casein, and albumin; naturally occurring rubbers, such as gum arabic and tragacanth; glucosides such as saponin; alginic acid and alginic acid derivatives, such as propylene glycol alginate; and cellulose derivatives, such as methyl cellulose, carboxymethyl cellulose and ethylhydroxy cellulose; wool and silk, and synthetic polymers.

Suitable examples of monomers for synthesising polymeric dispersants include: acrylic acid, methacrylic acid, maleic acid (or there salts), maleic anhydride, alkyl(meth)acrylates (linear, branched and cycloalkyl) such as methyl(meth)acrylate, n-butyl(meth)acrylate, tert-butyl(meth)acrylate, cyclohexyl(meth)acrylate, and 2-ethylhexyl(meth)acrylate; aryl(meth)acrylates such as benzyl(meth)acrylate, and phenyl(meth)acrylate; hydroxyalkyl(meth)acrylates such as hydroxyethyl(meth)acrylate, and hydroxypropyl(meth)acrylate; (meth)acrylates with other types of functionalities (e.g., oxiranes, amino, fluoro, polyethylene oxide, phosphate substituted) such as glycidyl(meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidyl ether; styrenics such as styrene, 4-methylstyrene, 4-hydroxystyrene, 4-acetostyrene, and styrene sulfonic acid; (meth)acrylonitrile; (meth)acrylamides (including N-mono and N,N-disubstituted) such as N-benzyl(meth)acrylamide; maleimides such as N-phenyl maleimide; vinyl derivatives such as vinyl alcohol, vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate. Typical condensation type polymers include polyurethanes, polyamides, polycarbonates, polyethers, polyureas, polyimines, polyimides, polyketones, polyester, polysiloxane, phenol-formaldehyde, urea-formaldehyde, melamine-formaldehyde, polysulfide, polyacetal or combinations thereof.

Suitable copolymeric dispersants are acrylic acid/acrylonitrile copolymer, vinyl acetate/acrylic ester copolymer, acrylic acid/acrylic ester copolymer, styrene/acrylic acid copolymer, styrene/methacrylic acid copolymer, styrene/methacrylic acid/acrylic ester copolymer, styrene/α-methylstyrene/acrylic acid copolymer, styrene/α-methylstyrene/acrylic acid/acrylic ester copolymer, styrene/maleic acid copolymer, styrene/maleic anhydride copolymer, vinylnaphthalene/acrylic acid copolymer, vinylnapthalene/maleic acid copolymer, vinyl acetate/ethylene copolymer, vinyl acetate/fatty acid/ethylene copolymer, vinyl acetate/maleic ester copolymer, vinyl acetate/crotonic acid copolymer, vinyl acetate/acrylic acid copolymer.

Suitable chemistries of copolymeric dispersants also include:
Copolymers which are the product of a condensation process of poly(ethylene imine) with a carboxylic acid terminated polyester (made by addition polymerization); and
Copolymers which are the product of a reaction of a multifunctional isocyanate with:
a compound monosubstituted with a group that is capable of reacting with an isocyanate, e.g., polyester;
a compound containing two groups capable of reacting with an isocyanate (cross-linker); or
a compound with at least one basic ring nitrogen and a group that is capable of reacting with an isocyanate group.

A detailed list of suitable polymeric dispersants is disclosed by MC CUTCHEON, Functional Materials, North American Edition, Glen Rock, N.J.: Manufacturing Confectioner Publishing Co., 1990, pp. 110-129.

Suitable pigment stabilizers are also disclosed in DE 19636382 (BAYER), U.S. Pat. No. 5,720,802 (XEROX), U.S. Pat. No. 5,713,993 (DU PONT), WO 96/12772 (XAAR), and U.S. Pat. No. 5,085,689 (BASF).

One polymeric dispersant or a mixture of two or more polymeric dispersants may be present to improve the dispersion stability further. Sometimes surfactants can also be used as pigment dispersants, thus a combination of a polymeric dispersant with a surfactant is also possible.

The polymeric dispersant can be non-ionic, anionic or cationic in nature; salts of the ionic dispersants can also be used.

The polymeric dispersant preferably has a polymerization degree DP between 5 and 1,000, more preferably between 10 and 500 and most preferably between 10 and 100.

The polymeric dispersant preferably has a number average molecular weight Mn between 500 and 30,000, more preferably between 1,500 and 10,000.

The polymeric dispersant preferably has an average molecular weight Mw smaller than 100,000, more preferably smaller than 50,000 and most preferably smaller than 30,000.

The polymeric dispersant preferably has a polymeric dispersity PD smaller than 2, more preferably smaller than 1.75 and most preferably smaller than 1.5.

Commercial examples of polymeric dispersants are the following:
DISPERBYK™ dispersants available from BYK CHEMIE GMBH;
SOLSPERSE™ dispersants available from NOVEON;

TEGO™ DISPERS™ dispersants from DEGUSSA;
EDAPLAN™ dispersants from MÜNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC and Disperbyk™ dispersants from BYK CHEMIE GMBH.

Particularly preferred dispersants for solvent based pigmented dispersions are Solsperse™ 32000 and 39000 from NOVEON.

Particularly preferred dispersants for oil based pigmented dispersions are Solsperse™ 11000, 11200, 13940, 16000, 17000 and 19000 from NOVEON.

Particularly preferred dispersants for UV-curable pigmented dispersions are Solsperse™ 32000 and 39000 dispersants from NOVEON.

The polymeric dispersant is preferably used in an amount of 2 to 600 wt %, more preferably 5 to 200 wt % based on the weight of the pigment.

Dispersion Media

In one preferred embodiment, the dispersion medium includes organic solvent(s). Suitable organic solvents include alcohols, ketones, esters, ethers, glycols and polyglycols and derivatives thereof, lactones, N-containing solvents such as amides. Preferably mixtures of one or more of these solvents are used.

Examples of suitable alcohols include methyl alcohol, ethyl alcohol, n-propyl alcohol, isopropyl alcohol, n-butyl alcohol, heptyl alcohol, octyl alcohol, cyclohexyl alcohol, benzyl alcohol, phenylethyl alcohol, phenylpropyl alcohol, furfuryl alcohol, anise alcohol and fluoroalcohols.

Examples of suitable ketones include acetone, methyl ethyl ketone, methyl n-propyl ketone, methyl isopropyl ketone, methyl n-butyl ketone, methyl isobutyl ketone, methyl n-amyl ketone, methyl isoamyl ketone, diethyl ketone, ethyl n-propyl ketone, ethyl isopropyl ketone, ethyl n-butyl ketone, ethyl isobutyl ketone, di-n-propyl ketone, diisobutyl ketone, cyclohexanone, methylcyclohexanone and isophorone, 2,4-pentanedione and hexafluoroacetone.

Examples of suitable esters include methyl acetate, ethyl acetate, n-propyl acetate, isopropyl acetate, n-butyl acetate, isobutyl acetate, hexyl acetate, octyl acetate, benzyl acetate, phenoxyethyl acetate, ethyl phenyl acetate, methyl lactate, ethyl lactate, propyl lactate, butyl lactate; methyl propionate, ethyl propionate, benzyl propionate, ethylene carbonate, propylene carbonate, amyl acetate, ethyl benzoate, butyl benzoate, butyl laurate, isopropyl myristate, isopropyl palmirate, triethyl phosphate, tributyl phosphate, diethyl phthalate, dibutyl phthalate, diethyl malonate, dipropyl malonate, diethyl succinate, dibutyl succinate, diethyl glutarate, diethyl adipate, dibutyl adipate and diethyl sebacate.

Examples of suitable ethers include butyl phenyl ether, benzyl ethyl ether, hexyl ether, diethyl ether, dipropyl ether, tetrahydrofuran and dioxane.

Examples of suitable glycols and polyglycols include ethylene glycol, diethylene glycol, triethylene glycol, propylene glycol, dipropylene glycol and tripropylene glycol.

Examples of suitable glycol and polyglycol derivatives include ethers such as alkylene glycol mono alkyl ethers, alkylene glycol dialkyl ethers, polyalkylene glycol monoalkyl ethers, polyalkylene glycol dialkyl ethers and esters of the preceding glycol ethers such as acetate and propionate esters, in case of dialkyl ethers only one ether function (resulting in mixed ether/ester) or both ether functions can be esterized (resulting in dialkyl ester).

Examples of suitable alkylene glycol mono alkyl ethers include ethylene glycol mono methyl ether, ethylene glycol mono ethyl ether, ethylene glycol mono propyl ether, ethylene glycol mono butyl ether, ethylene glycol mono hexyl ether, ethylene glycol mono 2-ethyl-hexyl ether, ethylene glycol mono phenyl ether, propylene glycol mono methyl ether, propylene glycol mono ethyl ether, propylene glycol mono n-propyl ether, propylene glycol mono n-butyl ether, propylene glycol mono iso-butyl ether, propylene glycol mono t-butyl ether and propylene glycol mono phenyl ether.

Examples of suitable alkylene glycol dialkyl ethers include ethylene glycol dimethyl ether, ethylene glycol diethyl ether, ethylene glycol methyl ethyl ether, ethylene glycol dibutyl ether, propylene glycol dimethyl ether, propylene glycol diethyl ether and propylene glycol dibutyl ether.

Examples of suitable polyalkylene glycol mono alkyl ethers include diethylene glycol mono methyl ether, diethylene glycol mono ethyl ether, diethylene glycol mono-n-propyl ether, diethylene glycol mono n-butyl ether, diethylene glycol mono hexyl ether, triethylene glycol mono methyl ether, triethylene mono ethyl ether, triethylene glycol mono butyl ether, dipropylene mono methyl ether, dipropylene glycol mono ethyl ether, dipropylene glycol n-propyl ether, dipropylene glycol mono n-butyl ether, dipropylene mono t-butyl ether, tripropylene glycol mono methyl ether, tripropylene glycol mono ethyl ether, tripropylene glycol mono n-propyl ether and tripropylene glycol mono n-butyl ether.

Examples of suitable polyalkylene glycol dialkyl ethers include diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol methyl ethyl ether, triethylene glycol methyl ethyl ether, tetraethylene glycol methyl ethyl ether, diethylene glycol di-n-propyl ether, diethylene glycol di-iso-propyl ether, dipropylene glycol dimethyl ether, dipropylene glycol diethyl ether, dipropylene di n-propyl ether, dipropylene di t-butyl ether, tripropylene glycol dimethyl ether and tripropylene glycol diethyl ether.

Examples of suitable glycol esters include ethylene glycol monomethyl ether acetate, ethylene glycol monoethyl ether acetate, ethylene glycol monopropyl ether acetate, ethylene glycol monobutyl ether acetate, diethylene glycol monoethyl ether acetate, diethylene glycol monobutyl ether acetate, propylene glycol monomethyl ether acetate, propylene glycol monoethyl ether acetate, dipropylene glycol monomethyl ether acetate and propylene glycol monomethyl ether propionate.

Preferred solvents for use in the pigment dispersion and inkjet inks according to preferred embodiments of the present invention are one or more polyalkyleneglycol dialkylethers represented by the formula (PAG)

$$R_1-[O-Y]_n O-R_2 \quad \text{Formula (PAG)}$$

wherein $R_1$ and $R_2$ are each independently selected from an alkyl group having 1 to 4 carbon atoms;

Y represents an ethylene group and/or a propylene group; wherein n is an integer selected from 4 to 20 for a first polyalkyleneglycol dialkylether; and n is an integer selected from 5 to 20 for a second polyalkyleneglycol.

The alkyl groups $R_1$ and $R_2$ of the polyalkyleneglycol dialkylethers according to Formula (PAG) preferably represent methyl and/or ethyl. Most preferably the alkyl groups $R_1$ and $R_2$ are both methyl groups.

In a preferred embodiment, the polyalkyleneglycol dialkylethers according to Formula (PAG) are polyethylene glycol dialkylethers.

In another preferred embodiment, a mixture of 2, 3, 4 or more polyalkyleneglycol dialkylethers, more preferably polyethylene glycol dialkylethers are present in the pigment dispersion or inkjet ink.

Suitable mixtures of polyalkyleneglycol dialkylethers for the pigment dispersions include mixtures of polyethylene glycol dimethyl ethers having a molecular weight of at least 200, such as Polyglycol DME 200™, Polyglycol DME 250M and Polyglycol DME 500™ from CLARIANT. The polyalkyleneglycol dialkylethers used in non-aqueous inkjet inks preferably have an average molecular weight between 200 and 800, and more preferably no polyalkyleneglycol dialkylethers with a molecular weight of more than 800 are present. The mixture of polyalkyleneglycol dialkylethers is preferably a homogeneous liquid mixture at room temperature.

Suitable commercial glycol ether solvents include Cellosolve™ solvents and Carbitol™ solvents from UNION CARBIDE, Ektasolve™ solvents from EASTMAN, Dowanol™ solvents from DOW, Oxitoll™ solvents, Dioxitoll™ solvents, Proxitoll™ solvents and Diproxitoll™ solvents from SHELL CHEMICAL and Arcosolv™ solvents from LYONDELL.

Lactones are compounds having a ring structure formed by ester bonds and can be of the γ-lactone (5-membered ring structure), δ-lactone (6-membered ring structure) or ε-lactone (7-membered ring structure) types. Suitable examples of lactones include γ-butyrolactone, γ-valerolactone, γ-hexylactone, γ-heptalactone, γ-octalactone, γ-nonalactone, γ-decalactone, γ-undecalactone, δ-valerolactone, δ-hexylactone, δ-heptalactone, δ-octalactone, δ-nonalactone, δ-decalactone, δ-undecalactone and ε-caprolactone.

Suitable examples of N-containing organic solvents include 2-pyrrolidone, N-methylpyrrolidone, N,N-dimethylacetamid, N,N-dimethylformamid, acetonitril and N,N-dimethyldodecanamide.

In another preferred embodiment, the dispersion medium includes oil types of liquids, alone or in combination with organic solvent(s). Suitable organic solvents include alcohols, ketones, esters, ethers, glycols and polyglycols and derivatives thereof, lactones, N-containing solvents such as amides, higher fatty acid ester and mixtures of one or more of the solvents as described above for solvent based dispersion media.

The amount of polar solvent is preferably lower than the amount of oil. The organic solvent preferably has a high boiling point, preferably above 200° C. Examples of suitable combinations are disclosed by GB 2303376 (FUJITSU ISOTEC) especially for the use of oleyl alcohol and EP 1157070 A (MARCONI DATA SYSTEMS) for the combination of oil and volatile organic solvent.

Suitable oils include saturated hydrocarbons and unsaturated hydrocarbons, aromatic oils, paraffinic oils, extracted paraffinic oils, napthenic oils, extracted napthenic oils, hydrotreated light or heavy oils, vegetable oils, white oils, petroleum naphtha oils, halogen-substituted hydrocarbons, silicones and derivatives and mixtures thereof.

Hydrocarbons may be selected from straight chain or branched chain aliphatic hydrocarbons, alicyclic hydrocarbons and aromatic hydrocarbons. Examples of hydrocarbons are saturated hydrocarbons such as n-hexane, isohexane, n-nonane, isononane, dodecane and isododecane; unsaturated hydrocarbons such as 1-hexene, 1-heptene and 1-octene; cyclic saturated hydrocarbons such as cyclohexane, cycloheptane, cyclooctane, cyclodecane and decalin; cyclic unsaturated hydrocarbons such as cyclohexene, cycloheptene, cyclooctene, 1,3,5,7-cyclooctatetraene; and cyclododecene; and aromatic hydrocarbons such as benzene, toluene, xylene, naphthalene, phenanthrene, anthracene and derivatives thereof. In literature the term paraffinic oil is often used. Suitable paraffinic oils can be normal paraffin type (octane and higher alkanes), isoparaffins (isooctane and higher isoalkanes) and cycloparaffins (cyclooctane and higher cycloalkanes) and mixtures of paraffin oils. The term "liquid paraffin" is often used to refer to a mixture of mainly including three components of a normal paraffin, an isoparaffin and a monocyclic paraffin, which is obtained by highly refining a relatively volatile lubricating oil fraction through a sulphuricacid washing or the like, as described in U.S. Pat. No. 6,730,153 (SAKATA INX). Suitable hydrocarbons are also described as de-aromatized petroleum distillates.

Suitable examples of halogenated hydrocarbons include methylene dichloride, chloroform, tetrachloromethane and methyl chloroform. Other suitable examples of halogen-substituted hydrocarbons include perfluoro-alkanes, fluorine-based inert liquids and fluorocarbon iodides.

Suitable examples of silicone oils include dialkyl polysiloxane (e.g., hexamethyl disiloxane, tetramethyl disiloxane, octamethyl trisiloxane, hexamethyl trisiloxane, heptamethyl trisiloxane, decamethyl tetrasiloxane, trifluoropropyl heptamethyl trisiloxane, diethyl tetramethyl disiloxane), cyclic dialkyl polysiloxane (e.g., hexamethyl cyclotrisiloxane, octamethyl cyclotetrasiloxane, tetramethyl cyclotetrasiloxane, tetra(trifluoropropyl)tetramethyl cyclotetrasiloxane), and methylphenyl silicone oil.

White oil is a term used for white mineral oils, which are highly refined mineral oils that consist of saturated aliphatic and alicyclic non-polar hydrocarbons. White oils are hydrophobic, colorless, tasteless, odourless, and do not change color over time.

Vegetable oils include semi-drying oils such as soybean oil, cotton seed oil, sunflower oil, rape seed oil, mustard oil, sesame oil and corn oil; non-drying oils such as olive oil, peanut oil and tsubaki oil; and drying oils such as linseed oil and safflower oil, wherein these vegetable oils can be used alone or as a mixture thereof.

Examples of other suitable oils include petroleum oils, non-drying oils and semi-drying oils.

Commercially available suitable oils include the aliphatic hydrocarbons types such as the Isopar™ range (isoparaffins) and Varsol/Naphtha range from EXXON CHEMICAL, the Soltrol™ range and hydrocarbons from CHEVRON PHILLIPS CHEMICAL, and the Shellsol™ range from SHELL CHEMICALS.

Suitable commercial normal paraffins include the Norpar™ range from EXXON MOBIL CHEMICAL.

Suitable commercial napthenic hydrocarbons include the Nappar™ range from EXXON MOBIL CHEMICAL.

Suitable commercial de-aromatized petroleum distillates include the Exxsol™ D types from EXXON MOBIL CHEMICAL Suitable commercial fluoro-substituted hydrocarbons include fluorocarbons from DAIKIN INDUSTRIES LTD, Chemical Division.

Suitable commercial silicone oils include the silicone fluid ranges from SHIN-ETSU CHEMICAL, Silicone Division.

Suitable commercial white oils include Witco™ white oils from CROMPTON CORPORATION.

If the non-aqueous pigment dispersion is a curable pigment dispersion, the dispersion medium includes one or more monomers and/or oligomers to obtain a liquid dispersion medium. Sometimes, it can be advantageous to add a small amount of an organic solvent to improve the dissolution of the dispersant. The content of organic solvent should be lower than 20 wt % based on the total weight of the inkjet ink. In other cases, it can be advantageous to add a small amount of water, for example, to improve the spreading of the inkjet ink on a hydrophilic surface, but preferably the inkjet ink contains no water.

Preferred organic solvents include alcohols, aromatic hydrocarbons, ketones, esters, aliphatic hydrocarbons, higher fatty acids, carbitols, cellosolves, higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

In the case of a curable inkjet ink, the dispersion medium preferably includes monomers and/or oligomers.

Monomers and Oligomers

Any monomer or oligomer may be used as curable compound for the curable inkjet ink. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the inkjet ink can be adjusted by varying the ratio between the monomers and oligomers.

Any method of conventional radical polymerization, photo-curing system using photo acid or photo base generator, or photo induction alternating copolymerization may be employed. In general, radical polymerization and cationic polymerization are preferred, and photo induction alternating copolymerization needing no initiator may also be employed. Furthermore, a hybrid system of combinations of these systems is also effective.

Cationic polymerization is superior in effectiveness due to lack of inhibition of the polymerization by oxygen, however it is expensive and slow, especially under conditions of high relative humidity. If cationic polymerization is used, it is preferred to use an epoxy compound together with an oxetane compound to increase the rate of polymerization. Radical polymerization is the preferred polymerization process.

Any polymerizable compound commonly known in the art may be employed. Particularly preferred for use as a radiation curable compound in the radiation curable inkjet ink are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethyl-hexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, vinyl ether ethoxy (meth)acrylate, 2-acryloyloxyethylsuccinic acid, 2-acryloxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and alkoxylated cyclohexanone dimethanol diacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other suitable trifunctional acrylates include propoxylated glycerine triacrylate and propoxylated trimethylolpropane triacrylate.

Other higher functional acrylates include di-trimethylolpropane tetraacrylate, dipentaerythritol pentaacrylate, ethoxylated pentaerythritol tetraacrylate, methoxylated glycol acrylates and acrylate esters.

Furthermore, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the inkjet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

Suitable examples of styrene compounds are styrene, p-methylstyrene, p-methoxystyrene, β-methylstyrene, p-methyl-β-methylstyrene, α-methylstyrene and p-methoxy-β-methylstyrene.

Suitable examples of vinylnaphthalene compounds are 1-vinylnaphthalene, α-methyl-1-vinylnaphthalene, β-methyl-1-vinylnaphthalene, 4-methyl-1-vinylnaphthalene and 4-methoxy-1-vinylnaphthalene.

Suitable examples of N-vinyl heterocyclic compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

The cationically polymerizable compound of the inkjet ink can be one or more monomers, one or more oligomers or a combination thereof.

Suitable examples of cationically curable compounds can be found in Advances in Polymer Science, 62, pages 1 to 47 (1984) by J. V. Crivello.

The cationic curable compound may contain at least one olefin, thioether, acetal, thioxane, thietane, aziridine, N-, O-, S- or P-heterocycle, aldehyde, lactam or cyclic ester group.

Examples of cationic polymerizable compounds include monomers and/or oligomers epoxides, vinyl ethers, styrenes, oxetanes, oxazolines, vinylnaphthalenes, N-vinyl heterocyclic compounds, tetrahydrofurfuryl compounds.

The cationically polymerizable monomer can be mono-, di- or multi-functional or a mixture thereof.

Suitable cationic curable compounds having at least one epoxy group are listed in the "Handbook of Epoxy Resins" by Lee and Neville, McGraw Hill Book Company, New York (1967) and in "Epoxy Resin Technology" by P. F. Bruins, John Wiley and Sons New York (1968).

Examples of cationic curable compounds having at least one epoxy group include 1,4-butanediol diglycidyl ether, 3-(bis(glycidyloxymethyl)methoxy)-1,2-propane diol, limonene oxide, 2-biphenyl glycidyl ether, 3,4-epoxycyclohexylmethyl-3',4'-epoxycyclohexane carboxylate, epichlorohydrin-bisphenol S based epoxides, epoxidized styrenics and more epichlorohydrin-bisphenol F and A based epoxides and epoxidized novolaks.

Suitable epoxy compounds including at least two epoxy groups in the molecule are alicyclic polyepoxide, polyglycidyl ester of polybasic acid, polyglycidyl ether of polyol, polyglycidyl ether of polyoxyalkylene glycol, polyglycidyl ester of aromatic polyol, polyglycidyl ether of aromatic polyol, urethane polyepoxy compound, and polyepoxy polybutadiene.

Examples of cycloaliphatic bisepoxides include copolymers of epoxides and hydroxyl components such as glycols, polyols, or vinyl ether, such as 3,4-epoxycyclohexylmethyl-3', 4'-epoxycyclohexylcarboxylate; bis(3,4-epoxycylohexylmethyl) adipate; limonene bisepoxide; diglycidyl ester of hexahydrophthalic acid.

Examples of vinyl ethers having at least one vinyl ether group include ethyl vinyl ether, n-butyl vinyl ether, isobutyl vinyl ether, octadecyl vinyl ether, cyclohexyl vinyl ether, butanediol divinyl ether, hydroxyl butyl vinyl ether, cyclohexane dimethanol monovinyl ether, phenyl vinyl ether, p-methylphenyl vinyl ether, p-methoxyphenyl vinyl ether, α-methylphenyl vinyl ether, β-methylisobutyl vinyl ether and β-chloroisobutyl vinyl ether, diethyleneglycol divinyl ether, triethylene glycol divinyl ether, n-propyl vinyl ether, isopropyl vinyl ether, dodecyl vinyl ether, diethylene glycol monovinyl ether, cyclohexanedimethanol divinyl ether, 4-(vinyloxy)butyl benzoate, bis[4-(vinyl oxy)butyl]adipate, bis[4-(vinyl oxy)butyl]succinate, 4-(vinyloxy methyl)cyclohexylmethyl benzoate, bis[4-(vinyloxy)butyl]isophthalate, bis[4-(vinyloxymethyl)cyclohexylmethyl]glutarate, tris[4-(vinyloxy)butyl]trimellitate, 4-(vinyloxy)butyl steatite, bis [4-(vinyloxy)butyl]hexanediylbiscarbamate, bis[4-(vinyloxy)methyl]cyclohexyl]methyl]terephthalate, bis[4-(vinyloxy)methyl]cyclohexyl]methyl]isophthalate, bis[4-(vinyloxy)butyl](4-methyl-1,3-phenylene)-biscarbamate, bis[4-vinyloxy)butyl](methylenedi-4,1-phenylene) biscarbamate and 3-amino-1-propanol vinyl ether.

Suitable examples of oxetane compounds having at least one oxetane group include 3-ethyl-3-hydroloxymethyl-1-oxetane, the oligomeric mixture 1,4-bis[3-ethyl-3-oxetanyl methoxy)methyl]benzene, 3-ethyl-3-phenoxymethyl-oxetane, bis([1-ethyl(3-oxetanil)]methyl)ether, 3-ethyl-3-[(2-ethylhexyloxy)methyl]oxetane, 3-ethyl-[(tri-ethoxysilyl propoxy)methyl]oxetane and 3,3-dimethyl-2(p-methoxyphenyl)-oxetane.

A preferred class of monomers and oligomers which can be used in both radiation and cationically curable compositions are vinyl ether acrylates such as those described in U.S. 6,310,115 (AGFA), incorporated herein by reference. Particularly preferred compounds are 2-(2-vinyloxyethoxy) ethyl (meth)acrylate, most preferably the compound is 2-(2-vinyloxyethoxy)ethyl acrylate.

Initiators

The curable inkjet ink preferably also contains an initiator. The initiator typically initiates the polymerization reaction. The initiator can be a thermal initiator, but is preferably a photo-initiator. The photo-initiator requires less energy to activate than the monomers, oligomers and/or prepolymers to form the polymer. The photo-initiator suitable for use in the curable inkjet inks may be a Norrish type I initiator, a Norrish type II initiator or a photo-acid generator.

Thermal initiator(s) suitable for use in the curable inkjet ink include tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl) benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid and potassium persulfate.

The photo-initiator or photo-initiator system absorbs light and is responsible for the production of initiating species, such as free radicals and cations. Free radicals and cations are high-energy species that induce polymerization of monomers, oligomers and polymers and with polyfunctional monomers and oligomers thereby also inducing cross-linking.

Irradiation with actinic radiation may be achieved in two steps by changing wavelength or intensity. In such cases it is preferred to use 2 types of photo-initiator together.

A combination of different types of initiator, for example, a photo-initiator and a thermal initiator can also be used.

A preferred Norrish type I-initiator is selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and α-halophenylglyoxalates.

A preferred Norrish type II-initiator is selected from the group consisting of benzophenones, thioxanthones, 1,2-diketones and anthraquinones. A preferred co-initiator is selected from the group consisting of an aliphatic amine, an aromatic amine and a thiol. Tertiary amines, heterocyclic thiols and 4-dialkylamino-benzoic acid are particularly preferred as co-initiator.

Suitable photo-initiators are disclosed in CRIVELLO, J. V., et al. VOLUME III: Photoinitiators for Free Radical Cationic and Anionic Polymerization, 2nd Edition, edited by BRADLEY, G., London, UK: John Wiley and Sons Ltd, 1998, pp. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluophosphate.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

Suitable cationic photo-initiators include compounds, which form aprotic acids or Bronsted acids upon exposure to ultraviolet and/or visible light sufficient to initiate polymerization. The photo-initiator used may be a single compound, a mixture of two or more active compounds, or a combination of two or more different compounds, i.e., co-initiators. Non-limiting examples of suitable cationic photo-initiators are aryldiazonium salts, diaryliodonium salts, triarylsulphonium salts, triarylselenonium salts and the like.

The curable inkjet ink may contain a photo-initiator system containing one or more photo-initiators and one or more sensitizers that transfer energy to the photo-initiator(s). Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes. The amount of the sensitizer is in general from 0.01 to 15 wt %, preferably from 0.05 to 5 wt %, based in each case on the total weight of the curable inkjet ink.

In order to increase the photosensitivity further, the curable inkjet ink may additionally contain co-initiators. For example, the combination of titanocenes and trichloromethyl-s-triazines, of titanocenes and ketoxime ethers and of acridines and trichloromethyl-s-triazines is known. A further increase in sensitivity can be achieved by adding dibenzalacetone or amino acid derivatives. The amount of co-initiator or co-initiators is in general from 0.01 to 20 wt %, preferably from 0.05 to 10 wt %, based in each case on the total weight of the curable inkjet ink.

A preferred initiator system is 2,2'-bis(o-chlorophenyl)-4,4',5,5'-tetraphenyl-(7CI,8CI) 4,4'-Bi-4H-imidazole corresponding to the chemical formula:

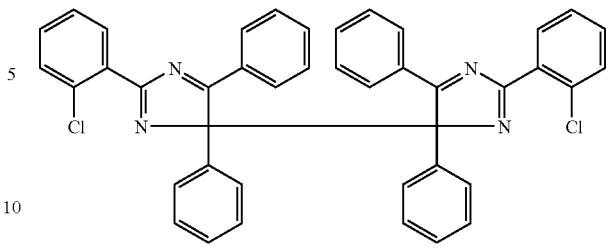

in the presence of a co-initiator such as 2-mercapto benzoxazole.

Another preferred type of initiator is an oxime ester. A suitable example has as chemical formula:

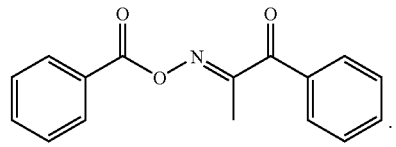

A preferred amount of initiator is 0.3-50 wt % of the total weight of the curable liquid, and more preferably 1-15 wt % of the total weight of the curable inkjet ink.

Irradiation with actinic radiation may be achieved in two steps by changing wavelength or intensity. In such cases it is preferred to use 2 types of photo-initiators together.

Inhibitors

The radiation curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total ink.

Binders

Non-aqueous inkjet ink compositions preferably include a binder resin. The binder functions as a viscosity controlling agent and also provides fixability relative to the polymeric resin substrate, e.g., a polyvinyl chloride substrate, also called vinyl substrate. The binder must be selected to have a good solubility in the solvent(s).

Suitable examples of binder resins include acrylic resins, modified acrylic resins, styrene acrylic resins, acrylic copolymers, acrylate resins, aldehyde resins, rosins, rosin esters, modified rosins and modified rosin resins, acetyl polymers, acetal resins such as polyvinyl butyral, ketone resins, phenolic resins and modified phenolic resins, maleic resins and modified maleic resins, terpene resins, polyester resins, polyamide resins, polyurethane resins, epoxy resins, vinyl resins, vinyl chloride-vinyl acetate copolymer resins, cellulose type resins such as nitro cellulose, cellulose acetopropionate and cellulose acetate butyrate, and vinyl toluene-α-methylstyrene copolymer resin. These binders may be used alone or in a mixture thereof. The binder is preferably a film-forming thermoplastic resin.

The amount of binder resin in inkjet ink is preferably in the range of 0.1 to 30 wt %, more preferably 1 to 20 wt %, most preferably 2 to 10 wt % based on the total weight of the inkjet ink.

Surfactants

The inkjet ink may contain at least one surfactant. The surfactant(s) can be anionic, cationic, non-ionic, or zwitterionic and are usually added in a total quantity less than 20 wt % based on the total weight of the inkjet ink and particularly in a total less than 10 wt % based on the total weight of the inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous inkjet inks, preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In a curable inkjet ink, a fluorinated or silicone compound may be used as a surfactant, preferably a cross-linkable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

Humectants/Penetrants

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are triethylene glycol mono butylether, glycerol and 1,2-hexanediol. The humectant is preferably added to the inkjet ink formulation in an amount of 0.1 to 40 wt % of the formulation, more preferably 0.1 to 10 wt % of the formulation, and most preferably approximately 4.0 to 6.0 wt %.

Preparation of a Pigmented InkJet Ink

The inkjet ink may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can include particles, preferably substantially spherical in shape, e.g., beads consisting essentially of a polymeric resin or yttrium stabilized zirconium beads.

In the process of mixing, milling and dispersion, each process is preferably performed with cooling to prevent build up of heat.

In the process of mixing, milling and dispersion, each process is performed with cooling to prevent build up of heat, and for radiation curable inkjet inks as much as possible under light conditions in which actinic radiation has been substantially excluded.

The inkjet ink may contain more than one pigment, the inkjet ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture include the mill grind and the milling media. The mill grind includes pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, mechanical means and residence conditions selected, the initial and desired final particle size, etc. In a preferred embodiment of the present invention, pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g., for a bead mill. The milled pigment concentrate is preferably separated from the milling media by filtration.

In general, it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, color, hue, saturation density, and print area coverage for the particular application.

Spectral Separation Factor

The spectral separation factor SSF was found to be an excellent measure to characterize a pigmented inkjet ink, as it takes into account properties related to light-absorption (e.g., wavelength of maximum absorbance $\lambda_{max}$, shape of the absorption spectrum and absorbance-value at $\lambda_{max}$) as well as properties related to the dispersion quality and stability.

A measurement of the absorbance at a higher wavelength gives an indication on the shape of the absorption spectrum.

The dispersion quality can be evaluated based on the phenomenon of light scattering induced by solid particles in solutions. When measured in transmission, light scattering in pigment inks may be detected as an increased absorbance at higher wavelengths than the absorbance peak of the actual pigment. The dispersion stability can be evaluated by comparing the SSF before and after a heat treatment of e.g., a week at 80° C.

The spectral separation factor SSF of the ink is calculated by using the data of the recorded spectrum of an ink solution or a jetted image on a substrate and comparing the maximum absorbance to the absorbance at a higher reference wavelength $\lambda_{ref}$. The spectral separation factor is calculated as the ratio of the maximum absorbance $\lambda_{max}$ over the absorbance $\lambda_{ref}$ at a reference wavelength.

$$SSF = \frac{A_{max}}{A_{ref}}$$

The SSF is an excellent tool to design inkjet ink sets with large color gamut. Often inkjet ink sets are now commercialized, wherein the different inks are not sufficiently matched with each other. For example, the combined absorption of all inks does not give a complete absorption over the whole visible spectrum, e.g., "gaps" exist between the absorption spectra of the colorants. Another problem is that one ink might be absorbing in the range of another ink. The resulting color gamut of these inkjet ink sets is low or mediocre.

EXAMPLES

Materials

All materials used in the following examples were readily available from standard sources such as Aldrich Chemical Co. (Belgium) and Acros (Belgium) unless otherwise specified. DEGDEE is diethylene glycol diethylether from ACROS. SOLSPERSE™ 32000 is a hyperdispersant from NOVEON. Potassium tert-butoxide from ACROS. Diethyl-5-(hydroxymethyl)isophthalate from ALDRICH. Thionylchloride from ACROS. 1,4-butanesultone from ACROS. Tridodecylamine from ACROS. PR202 is the abbreviation for C.I. Pigment Red 202 for which CINQUASIA MAG RT235D from CIBA SPECIALTY CHEMICALS was used. PR209 is the abbreviation for C.I. Pigment Red 209 for which HOSTAPERM™ RED EG TRANSPARANTis used. PR282 is the abbreviation for C.I. Pigment Red 282 for which IRGAZIN™ MAGENTA 2012 is used. QMIX is the abbreviation for a mixed crystal of C.I. Pigment Violet 19 and C.I. Pigment RED 122, for which CROMOPHTAL JET MAGENTA 2BC from CIBA SPECIALTY CHEMICALS was used. PV19 is the abbreviation for C.I. Pigment Violet 19 for which INK JET RED E5B02 from CLARIANT was used. PO71 is the abbreviation for C.I. Pigment Orange 71 for which Cromophtal™ DPP Orange TR from Ciba Specialty Chemicals was used. PO73 is the abbreviation for C.I. Pigment Orange 73 for which Irgazin™ DPP Orange R$^4$ from Ciba Specialty Chemicals was used. PR264 is the abbreviation for C.I. Pigment Red 264 for which Irgazin™ DPP Rubine TR from Ciba Specialty Chemicals was used. PR254 is the abbreviation for C.I. Pigment Red 254 for which Irgazin™ DPP Red BTR from Ciba Specialty Chemicals was used.

Measurement Methods

1. Measurement of SSF

The spectral separation factor SSF of the ink was calculated by using the data of the recorded spectrum of an ink solution and comparing the maximum absorbance to the absorbance at a reference wavelength. The reference wavelength is dependent on the pigment(s) used:

if the color ink has a maximum absorbance $A_{max}$ between 400 and 500 nm then the absorbance $A_{ref}$ must be determined at a reference wavelength of 600 nm, if the color ink has a maximum absorbance $A_{max}$ between 500 and 600 nm then the absorbance $A_{ref}$ must be determined at a reference wavelength of 650 nm, and if the color ink has a maximum absorbance $A_{max}$ between 600 and 700 nm then the absorbance $A_{ref}$ must be determined at a reference wavelength of 830 nm.

The absorbance was determined in transmission with a Shimadzu UV-2101 PC double beam-spectrophotometer. The ink was diluted with ethyl acetate to have a pigment concentration of 0.002%. A spectrophotometric measurement of the UV-VIS-NIR absorption spectrum of the diluted ink was performed in transmission-mode with a double beam-spectrophotometer using the settings of Table 2. Quartz cells with a path length of 10 mm were used and ethyl acetate was chosen as a blank.

TABLE 2

| Mode | Absorbance |
| --- | --- |
| Wavelength range | 240-900 nm |
| Slit width | 2.0 nm |
| Scan interval | 1.0 nm |
| Scan speed | Fast (1165 nm/min) |
| Detector | photo-multiplier (UV-VIS) |

Efficient pigmented inkjet inks exhibiting a narrow absorption spectrum and a high maximum absorbance have a value for SSF of at least 30.

2. Dispersion Stability

The dispersion stability was evaluated by comparing the SSF before and after a heat treatment of one week at 80° C. Pigmented inkjet inks exhibiting good dispersion stability have a SSF after heat treatment still larger than 30 and a loss in SSF of less than 35%.

3. Average Particle Size

The particle size of pigment particles in pigmented inkjet ink was determined by photon correlation spectroscopy at a wavelength of 633 nm with a 4 mW HeNe laser on a diluted sample of the pigmented inkjet ink. The particle size analyzer used was a Malvern™ nano-S available from Goffin-Meyvis.

The sample was prepared by addition of one drop of ink to a cuvet containing 1.5 mL ethyl acetate and mixed until a homogenous sample was obtained. The measured particle size is the average value of 3 consecutive measurements consisting of 6 runs of 20 seconds. For good inkjet characteristics (jetting characteristics and print quality) the average particle size of the dispersed particles is below 200 nm, preferably about 100 nm. The pigmented inkjet ink is considered to be a stable pigment dispersion if the particle size remained below 200 nm after a heat treatment of 7 days at 80° C.

Example 1

This example illustrates the synthesis of diketopyrrolopyrrole derivatives including at least one acidic group.

Dispersion Synergist DPC-1

Synthesis of the dispersion synergist DPC-1 was accomplished according to the following synthesis scheme:

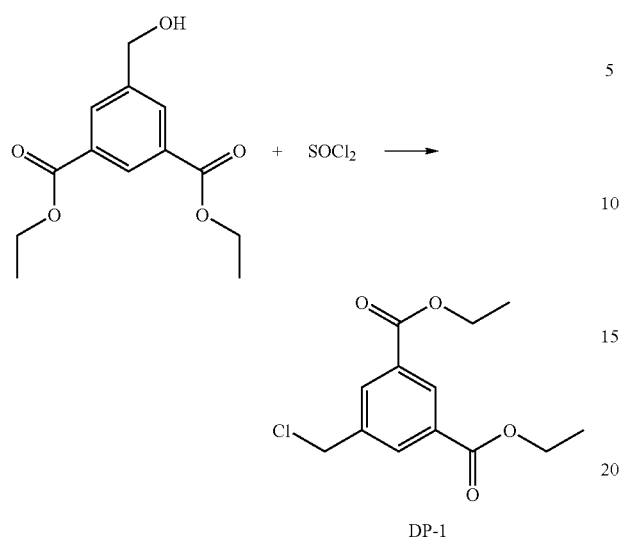

DP-1

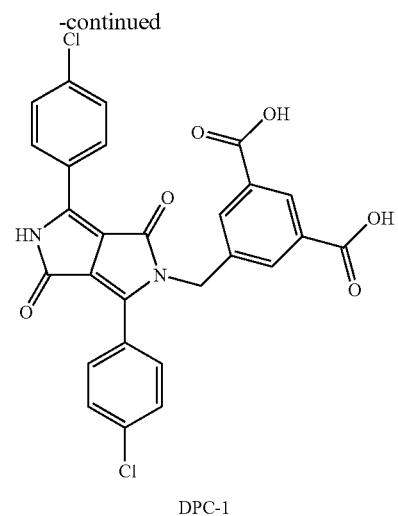

DPC-1

25 g (0.1 mol) of diethyl-5-(hydroxymethyl)isophthalate was dissolved in a mixture of 100 mL of methylenechloride and 0.3 g dimethylacetamide (catalyst). 19.6 g (0.165 mol) of thionylchloride was dropwise added and the mixture was stirred overnight. After this period, the mixture was cooled in an ice bath and 150 mL of ethanol was added. While the methylenechloride was evaporated under reduced pressure a solid appeared. This solid product DP-1 was filtered and washed with a small volume of ethanol. The yield was 86%.

35.7 g (0.1 mol) of PR254 in 500 mL dimethylsulfoxide was dissolved by the addition of 22.44 g (0.2 mol) potassium tert-butoxide. The solution was heated to about 70° C. and 27.1 g (0.1 mol) of compound DP-1 was added. The alkylation-step was completed after 4 hours and the mixture was cooled and 50 mL of methanol was added. A side product was filtered off and 60 mL (0.6 mol) of a sodium hydroxide solution (29%) was added to the filtrate. The hydrolyzation took place during a reflux of 30 minutes. After this period 500 mL of water was added and the dispersion synergist DPC-1 was precipitated with 57.2 mL (1 mol) of acetic acid. The dispersion synergist DPC-1 was filtered and washed with water. The yield was 40%.

Dispersion Synergist DPC-11

Synthesis of the dispersion synergist DPC-11 was accomplished according to the following synthesis scheme:

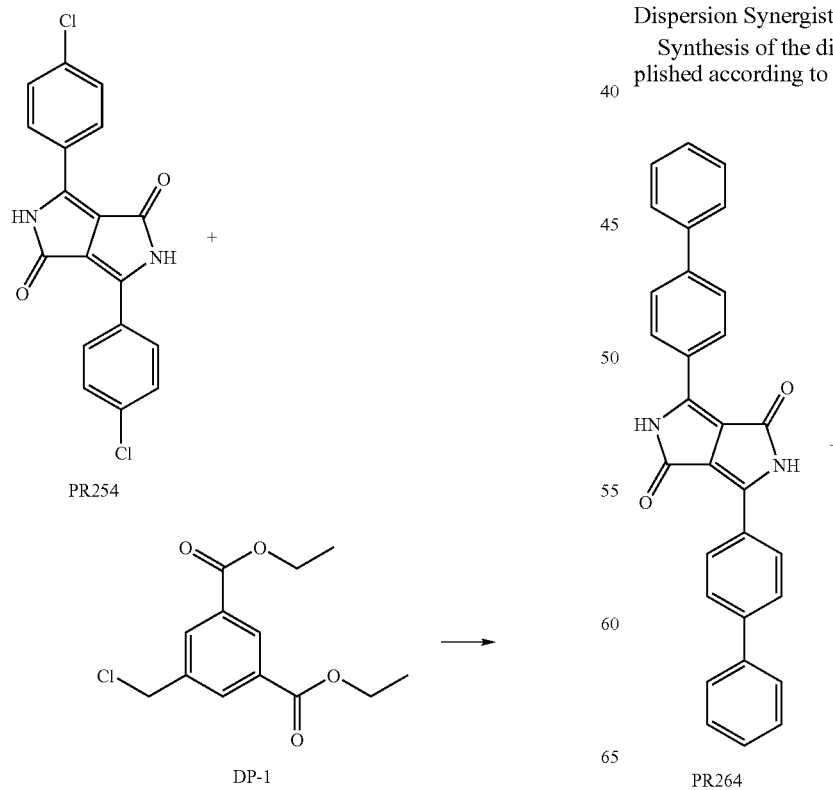

PR254

DP-1

PR264

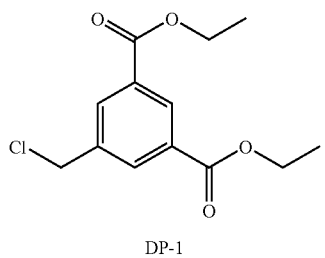

DP-1

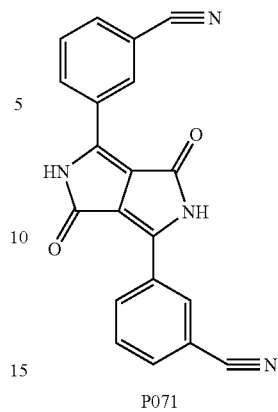

P071

+

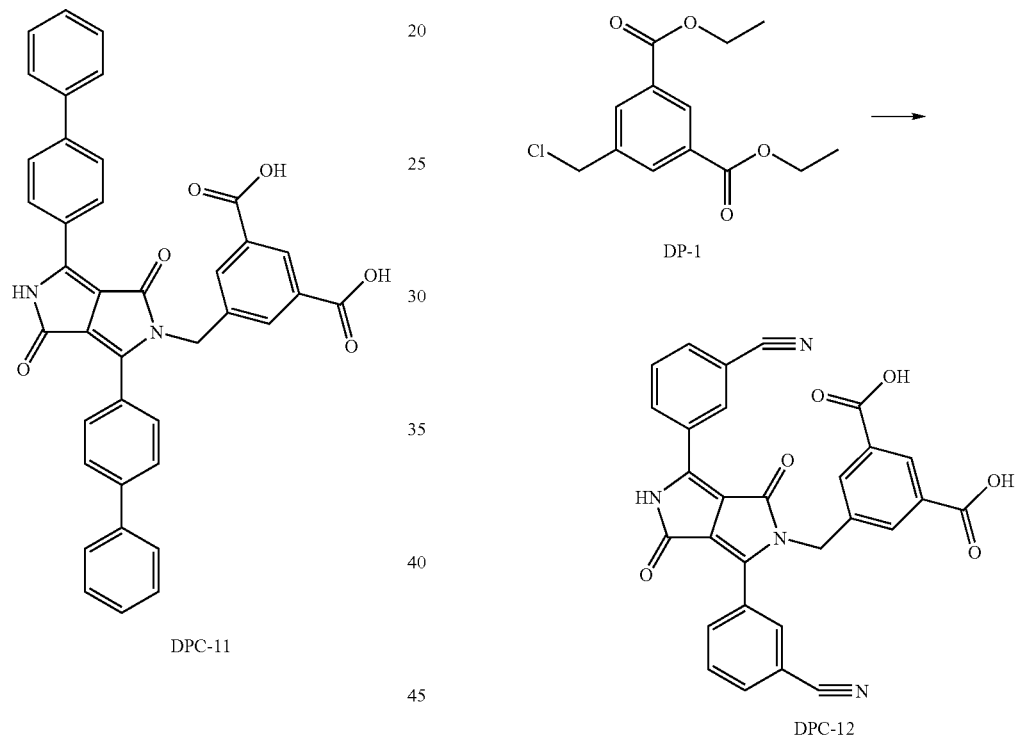

44.0 g (0.1 mol) of PR264 (=C.I. Pigment Red 264) in 500 mL dimethylsulfoxide was dissolved by the addition of 22.44 g (0.2 mol) potassium tert-butoxide. The solution was heated to about 70° C. and 27.1 g (0.1 mol) of compound DP-1 was added. The alkylation-step was completed after 4 hours and the mixture was cooled to 50° C. 500 mL of methanol was added and the unreacted starting product was filtered off. Hydrolyzation was started with the addition of 60 mL (0.6 mol) of a 29% sodium hydroxide solution to the filtrate. The solution was heated to 55° C. and after 30 minutes it was cooled to room temperature. 57.2 mL (1 mol) of acetic acid was added and the synergist was precipitated with water. The dispersion synergist DPC-11 was filtered and washed with water. The yield was 16%.

Dispersion Synergist DPC-12

Synthesis of the dispersion synergist DPC-12 was accomplished according to the following synthesis scheme:

33.8 g (0.1 mol) of PO71 (=C.I. Pigment Orange 71) in 500 mL dimethylsulfoxide was dissolved by the addition of 22.44 g (0.2 mol) potassium tert-butoxide. The solution was heated to about 70° C. and 27.1 g (0.1 mol) of compound DP-1 was added. The alkylation-step was completed after 2 hours and the mixture was cooled to 50° C. 500 mL methanol and 60 mL (0.6 mol) of a 29% sodium hydroxide solution are added and the mixture was stirred at 50° C. After 30 minutes the unreacted starting product was filtered of. 57.2 mL (1 mol) of acetic acid was added to the filtrate and the synergist was precipitated with water. The dispersion synergist DPC-12 was filtered and washed with water. The yield was 32%.

Dispersion Synergist DPC-14

Synthesis of the dispersion synergist DPC-14 was accomplished according to the following synthesis scheme:

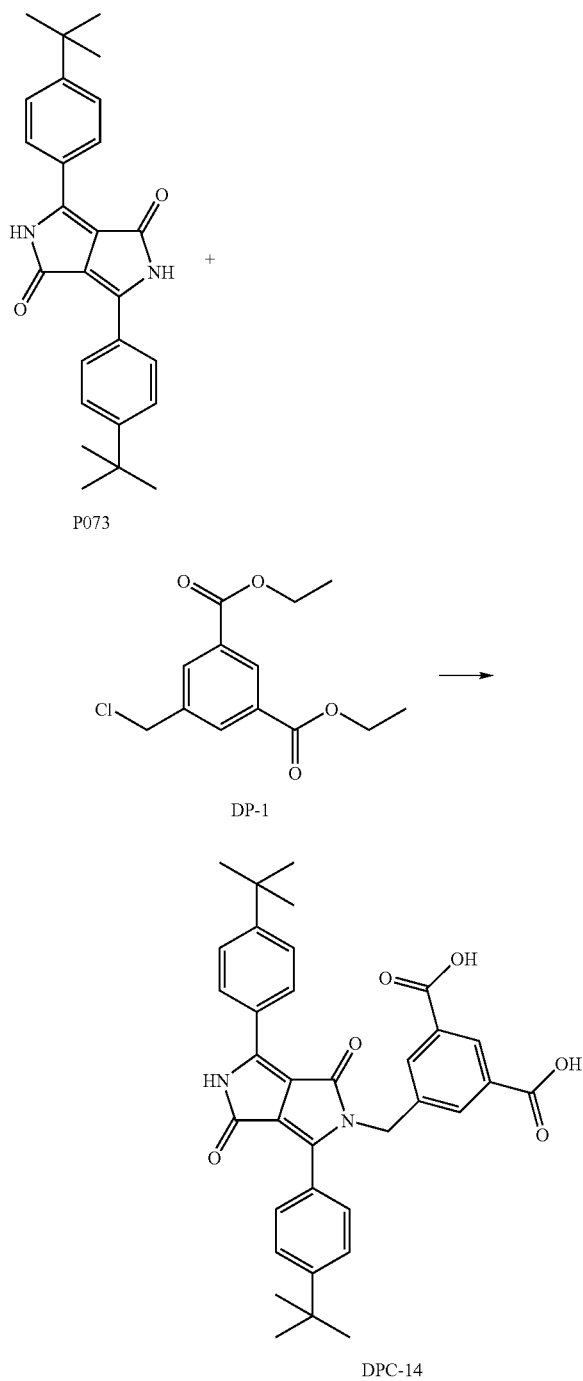

P073

DP-1

DPC-14

40.0 g (0.1 mol) of PO73 (=C.I. Pigment Orange 73) in 500 mL dimethylsulfoxide was dissolved by the addition of 22.44 g (0.2 mol) potassium tert-butoxide. The solution was heated to about 70° C. and 27.1 g (0.1 mol) of compound DP-1 was added. The alkylation-step was completed after 2 hours and the mixture was cooled to 50° C. 500 mL of methanol and 60 mL (0.6 mol) of a 29% sodium hydroxide solution are added and the mixture was stirred at 50° C. After 30 minutes the unreacted product was filtered of. 57.2 mL (1 mol) of acetic acid was added to the filtrate and the synergist was precipitated with water. The dispersion synergist DPC-14 was filtered and washed with water. The yield was 46%.

Example 2

This example illustrates that stable non-aqueous inkjet inks with high dispersion quality for producing high image quality images were obtained when using a diketopyrrolo-pyrrole derivative in combination with a quinacridone pigment.

Preparation and Evaluation of Non-aqueous Inkjet Inks

All inkjet inks were prepared in the same manner to obtain a composition as described in Table 3, except that different quinacridone pigments were used in combination with the dispersion synergist DPC-1. In the absence of a diketopyrrolo-pyrrole derivative as dispersion synergist, a pigment concentration of 5.00 wt % instead of 4.50 wt % was used.

TABLE 3

| Component | wt % |
| --- | --- |
| Pigment | 4.50 |
| DPC-1 | 0.50 |
| Solsperse™ 32000 | 5.00 |
| DEGDEE | 90.00 |

An ink composition was made by mixing the pigment, the polymeric dispersant Solsperse™ 32000, optionally the dispersion synergist and the organic solvent DEGDEE with a dissolver and subsequently treating this mixture with a roller mill procedure using yttrium-stabilized zirconium oxide-beads of 0.4 mm diameter ("high wear resistant zirconia grinding media" from TOSOH Co.). A polyethylene flask of 60 mL was filled to half its volume with grinding beads and 20 mL of the mixture. The flask was closed with a lid and put on the roller mill for three days. The speed was set at 150 rpm. After milling the dispersion was separated from the beads using a filter cloth.

Using the above method, the comparative inkjet inks COMP-1 to COMP-5 and the inventive inkjet inks INV-1 to INV-5 were prepared according to Table 4.

Evaluation of Inkjet Inks

The average particle size and the spectral separation factor SSF were determined to evaluate the dispersion quality and were determined again after a heat treatment of 7 days at 80° C. The results are listed in Table 4.

TABLE 4

| InkJet ink | Pigment | DPC-1 | No heat treatment SSF | Particle size (nm) | After 7 d/80° C. % Loss in SSF | % increase particle size |
| --- | --- | --- | --- | --- | --- | --- |
| COMP-1 | PR202 | No | 46 | 170 | 61% | 159% |
| COMP-2 | PR209 | No | 202 | 77 | 72% | 65% |
| COMP-3 | PR282 | No | 18 | 982 | 36% | 43% |
| COMP-4 | PV19 | No | 92 | 98 | 71% | 124% |
| COMP-5 | QMIX | No | 51 | 111 | 56% | 128% |
| INV-1 | PR202 | Yes | 90 | 77 | 1% | 3% |
| INV-2 | PR209 | Yes | 127 | 76 | 0% | 0% |
| INV-3 | PR282 | Yes | 48 | 153 | 29% | 46% |
| INV-4 | PV19 | Yes | 140 | 72 | 24% | 3% |
| INV-5 | QMIX | Yes | 114 | 70 | 0% | 1% |

Poor dispersion quality and/or stability were observed for the comparative inkjet inks COMP-1 to COMP-5 in the absence of the dispersion synergist. On the other hand the inventive inkjet inks INV-1 to INV-5 including a quinacridone pigment and the diketopyrrolo-pyrrole derivative DPC-1 containing 2 carboxyl groups as dispersion synergist all exhibited excellent dispersion quality and stability.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A non-aqueous pigment dispersion comprising:
   a quinacridone pigment, a polymeric dispersant, and a dispersion synergist in a dispersion medium; wherein
   the dispersion synergist is a diketopyrrolo-pyrrole derivative containing at least one acidic group or a salt thereof;
   the dispersion synergist is a diketopyrrolo-pyrrole derivative according to Formula (I):

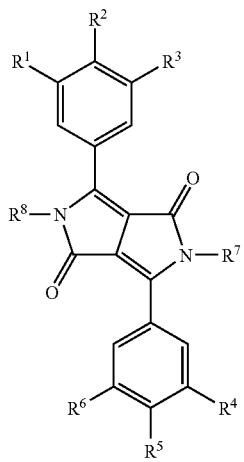

Formula (I)

wherein $R^1$, $R^2$, and $R^3$ are inderendently selected from the group consisting of hydrogen, a halogen atom, a methyl group, an ethyl group, a tert.-butyl group, a phenyl group, a cyano group, and an acidic group;
$R^4$ and $R^6$ are independently selected from the group consisting of hydrogen and a halogen atom;
$R^5$ is independently selected from the grourp consisting of hydrogen, a halogen atom, a methyl group, an ethyl group, a tert.-butyl group, and a cyano group; and
one of $R^7$ and $R^8$ is a group including at least one acidic group while the other one of $R^7$ and $R^8$ represents hydrogen.

2. The non-aqueous pigment dispersion according to claim 1, wherein the acidic group for $R^1$, $R^2$, and/or $R^3$ is a carboxyl group.

3. The non-aqueous pigment dispersion according to claim 1, wherein $R^1$ and $R^3$ represent a carboxyl group and $R^2$ represents hydrogen.

4. The non-aqueous pigment dispersion according to claim 1, wherein $R^1$, $R^2$, and $R^3$ are independently selected from the group consisting of hydrogen, a halogen atom, a methyl group, an ethyl group, a tert.-butyl group, a phenyl group, and a cyano group.

5. The non-aqueous pigment dispersion according to claim 3, wherein $R^1$, $R^3$, $R^4$, and $R^6$ represent hydrogen.

6. The non-aqueous pigment dispersion according to claim 5, wherein $R^2$ and $R^5$ represent a chloro atom.

7. The non-aqueous pigment dispersion according to claim 5, wherein $R^2$ and $R^5$ represent hydrogen.

8. The non-aqueous pigment dispersion according to claim 1, wherein one of $R^7$ and $R^8$ is a group including two acidic groups while the other one of $R^7$ and $R^8$ represents hydrogen.

9. The non-aqueous pigment dispersion according to claim 1, wherein the group including two acid functions $R^7$ or $R^8$ is selected from the group consisting of an alkanoic acid group, an alicyclic acid group, a heterocyclic acid group, a heteroaromatic acid group, and an aromatic acid group.

10. The non-aqueous pigment dispersion according to claim 9, wherein the aromatic acid group is a phthalic acid group, an isophthalic acid group, or a terephthalic acid group.

11. The non-aqueous pigment dispersion according to claim 1, wherein the salt of the group including the at least one acidic group is an ammonium acid salt group.

12. The non-aqueous pigment dispersion according to claim 11, wherein the ammonium acid salt group is a substituted ammonium group selected from the group consisting of $^+N(CH_3)_2(C_{18}H_{37})_2$, $^+NH(CH_3)_2(C_{18}H_{37})$, $^+N(CH_3)_2(C_{12}H_{25})_2$, $^+NH(CH_3)_2(C_{12}H_{25})$, $^+N(CH_3)_2(C_{10}H_{21})_2$, $^+NH(CH_3)_2(C_{10}H_{21})$, $^+N(CH_3)_2(C_8H_{17})_2$, $^+NH(CH_3)_2(C_8H_{17})$, $^+NH(C_8H_{17})_3$, $^+NH(C_{10}H_{21})_3$, $^+NH(C_{12}H_{25})_3$, and $^+NH(C_{18}H_{35})_3$.

13. The non-aqueous pigment dispersion according to claim 1, wherein the non-aqueous pigment dispersion is a curable inkjet ink or a non-aqueous inkjet ink containing an organic solvent and/or oil.

* * * * *